(12) United States Patent
Kubena et al.

(10) Patent No.: US 7,581,443 B2
(45) Date of Patent: Sep. 1, 2009

(54) DISC RESONATOR GYROSCOPES

(75) Inventors: Randall L. Kubena, Oak Park, CA (US); David T. Chang, Calabasas, CA (US)

(73) Assignee: The Boeing Company, Chiacgo, IL (US)

( * ) Notice: Subject to any disclaimer, the term of this patent is extended or adjusted under 35 U.S.C. 154(b) by 0 days.

(21) Appl. No.: 11/458,911

(22) Filed: Jul. 20, 2006

(65) Prior Publication Data

US 2007/0017287 A1      Jan. 25, 2007

Related U.S. Application Data

(60) Provisional application No. 60/701,218, filed on Jul. 20, 2005.

(51) Int. Cl.
*G01P 9/04* (2006.01)
(52) U.S. Cl. .................. 73/504.12; 73/504.13
(58) Field of Classification Search ............ 73/504.13, 73/504.12, 504.04, 514.16, 514.29
See application file for complete search history.

(56) References Cited

U.S. PATENT DOCUMENTS

| | | | |
|---|---|---|---|
| 392,650 | A | 11/1888 | Watrous |
| 4,426,769 | A * | 1/1984 | Grabbe ............ 29/832 |
| 4,898,031 | A | 2/1990 | Oikawa et al. |
| 5,203,208 | A | 4/1993 | Bernstein |
| 5,226,321 | A | 7/1993 | Varnham et al. |
| 5,421,312 | A | 6/1995 | Dawson |
| 5,578,976 | A | 11/1996 | Yao et al. |
| 5,646,346 | A | 7/1997 | Okada |
| 5,665,915 | A | 9/1997 | Kobayashi et al. |
| 5,728,936 | A | 3/1998 | Lutz |

(Continued)

FOREIGN PATENT DOCUMENTS

DE      44 42 033 A1      5/1996

(Continued)

OTHER PUBLICATIONS

Wright et al., "The HRG Applied to a Satellite Attitude Reference System," Guidance and Control, AASAAS, 1994, 86:1-13.

(Continued)

*Primary Examiner*—Helen C. Kwok
(74) *Attorney, Agent, or Firm*—Canady & Lortz LLP; Bradley K. Lortz

(57) ABSTRACT

Embodiments of the present invention are directed to apparatuses and methods of making a micromachined resonator gyroscope, e.g. a disc resonator gyro (DRG), including one or more of the following novel features. Embodiments of the invention may comprise a triple-wafer stack gyroscope with an all fused quartz (or all silicon) construction for an electrical baseplate, resonator and vacuum cap. This can yield superior thermal stability over prior art designs. A typical resonator embodiment may include a centrally anchored disc with high aspect-ratio in-plane electrostatic drive and sense electrodes to create large capacitance. A silicon sacrificial layer may be employed for attaching a quartz resonator wafer to a quartz handle wafer for high aspect-ratio etching. In addition, embodiments of the invention may comprise a low thermal stress, wafer-level vacuum packaged gyroscope with on-chip getter. An ultra-thin conductive layer deposited on the quartz resonator may also be utilized for high Q.

25 Claims, 19 Drawing Sheets

U.S. PATENT DOCUMENTS

| | | |
|---|---|---|
| 5,783,749 A | 7/1998 | Lee et al. |
| 5,894,090 A | 4/1999 | Tang et al. |
| 5,905,202 A | 5/1999 | Kubena et al. |
| 5,920,012 A | 7/1999 | Pinson |
| 5,987,985 A | 11/1999 | Okada |
| 6,009,751 A | 1/2000 | Ljung |
| 6,044,705 A | 4/2000 | Neukermans et al. |
| 6,094,985 A * | 8/2000 | Kapels et al. ............ 73/504.13 |
| 6,145,380 A | 11/2000 | MacGugan et al. |
| 6,151,964 A | 11/2000 | Nakajima |
| 6,155,115 A | 12/2000 | Ljung |
| 6,164,134 A | 12/2000 | Cargille |
| 6,182,352 B1 | 2/2001 | Deschenes et al. |
| 6,250,157 B1 | 6/2001 | Touge |
| 6,263,552 B1 | 7/2001 | Takeuchi et al. |
| 6,282,958 B1 | 9/2001 | Fell et al. |
| 6,289,733 B1 | 9/2001 | Challoner et al. |
| 6,349,597 B1 | 2/2002 | Folkmer et al. |
| 6,367,326 B1 | 4/2002 | Okada |
| 6,367,786 B1 | 4/2002 | Gutierrez et al. |
| 6,481,284 B2 | 11/2002 | Geen et al. |
| 6,481,285 B1 | 11/2002 | Shkel et al. |
| 6,513,380 B2 | 2/2003 | Reeds et al. |
| 6,515,278 B2 | 2/2003 | Wine et al. |
| 6,584,845 B1 | 7/2003 | Gutierrez et al. |
| 6,621,158 B2 * | 9/2003 | Martin et al. ............... 257/704 |
| 6,628,177 B2 | 9/2003 | Clark et al. |
| 6,629,460 B2 | 10/2003 | Challoner |
| 6,715,352 B2 | 4/2004 | Tracy |
| 6,796,179 B2 | 9/2004 | Bae et al. |
| 6,806,557 B2 * | 10/2004 | Ding ........................... 257/659 |
| 6,856,217 B1 | 2/2005 | Clark et al. |
| 6,883,374 B2 * | 4/2005 | Fell et al. ................. 73/504.13 |
| 6,985,051 B2 | 1/2006 | Nguyen et al. |
| 7,168,318 B2 * | 1/2007 | Challoner et al. ........ 73/504.13 |
| 2002/0066317 A1 | 6/2002 | Lin |
| 2003/0010123 A1 | 1/2003 | Malvern et al. |
| 2003/0029238 A1 | 2/2003 | Challoner |
| 2004/0055380 A1 | 3/2004 | Shcheglov et al. |

FOREIGN PATENT DOCUMENTS

| | | |
|---|---|---|
| DE | 19719601 A1 | 11/1998 |
| EP | 0 461 761 A1 | 12/1991 |
| EP | 1055908 A1 | 11/2000 |
| EP | 0 971 208 A2 | 12/2000 |
| JP | 401129517 A | 5/1989 |
| WO | WO 96/38710 | 12/1996 |
| WO | WO 98/15799 | 4/1998 |
| WO | WO 00/68640 | 11/2000 |
| WO | WO 01/44823 A | 6/2001 |
| WO | WO 01/74708 A | 10/2001 |

OTHER PUBLICATIONS

Putty et al., "A Micromachined Vibrating Ring Gyroscope,", Solid State Sensor and Actuator Workshop, Transducer Research Foundation, Hilton Head, 1994, pp. 213-220.

Tang et al., "A Packaged Silicon MEMS Vibratory Gyroscope for Microspacecraft," Proceedings IEEE, 10th Annual Int. Workshop on MEMS, Japan, 1997, pp. 500-505.

Barbour et al., "Micromechanical Silicon Instrument and Systems Development at Draper Laboratory," AIAA Guidance Navigation and Control Conference, 1996, Paper No. 96-3709.

Johnson et al., "Surface Micromachined Angular Rate Sensor," A1995 SAE Conference, Paper No. 950538, pp. 77-83.

Fujita et al., "Disk-shaped bulk micromachined gyroscope with vacuum sealing," Sensors and Actuators A:Physical, vol. 82, May 2000, pp. 198-204.

Skulski et al., "Planar resonator sensor for moisture measurements", Microwaves and Radar, 1998, MIKON '98, 12th International Conf., vol. 3, May 20-22, 1998, pp. 692-695.

Tang et al., "Silicon Bulk Micromachined Vibratory Gyroscope," Jet Propulsion Lab.

* cited by examiner

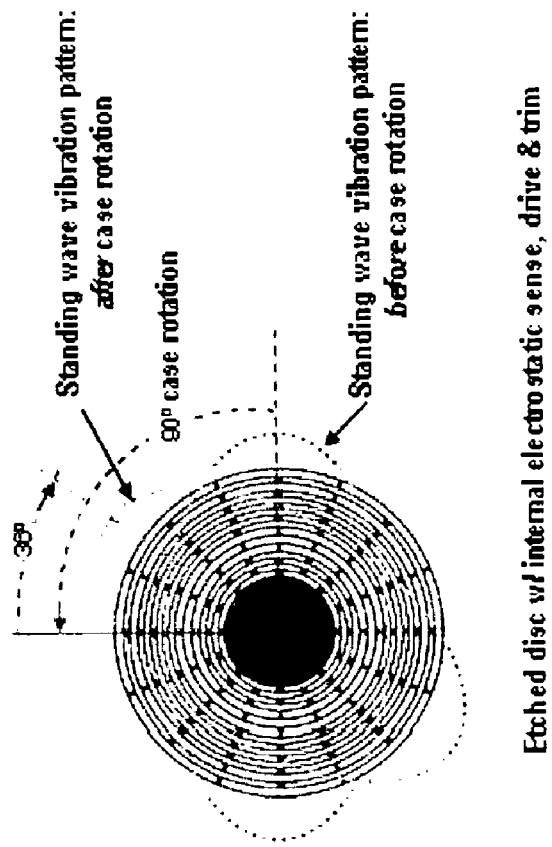
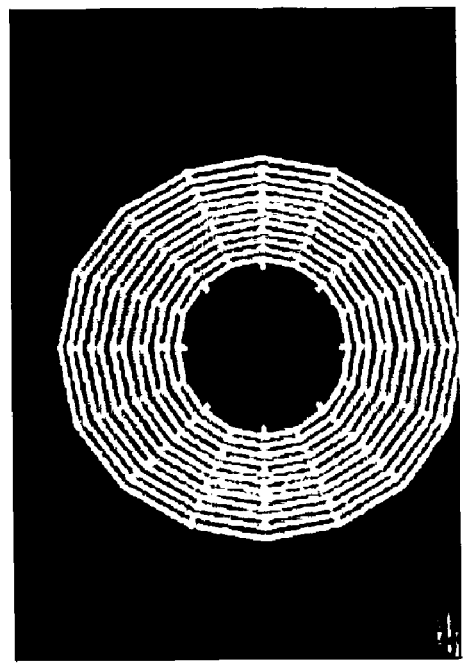
FIG. 1B

DISC RESONATOR GYROSCOPES

CROSS-REFERENCE TO RELATED APPLICATIONS

This application claims the benefit under 35 U.S.C. § 119 (e) of the following co-pending U.S. provisional patent application, which is incorporated by reference herein:

U.S. Provisional Patent Application No. 60/701,218, filed Jul. 20, 2006, by Kubena et al., entitled "ALL-QUARTZ DISC RESONATOR GYROSCOPE".

This application is related to the following patents, which are all incorporated by reference herein:

U.S. Pat. No. 6,915,215, issued Jul. 5, 2005, and entitled "INTEGRATED LOW POWER DIGITAL GYRO CONTROL ELECTRONICS", by Robert M'Closkey et al.;

U.S. Pat. No. 6,944,931, issued Sep. 20, 2005, and entitled "METHOD OF PRODUCING AN INTEGRAL RESONATOR SENSOR AND CASE", by Kirill V. Shcheglov et al.; and U.S. Pat. No. 7,040,163 issued May 9, 2006, and entitled "ISOLATED PLANAR GYROSCOPE WITH INTERNAL RADIAL SENSING AND ACTUATION", by Kirill V. Shcheglov and A. Dorian Challoner.

BACKGROUND OF THE INVENTION

1. Field of the Invention

The present invention relates to gyroscopes, and in particular to resonator microgyroscopes or inertial sensors and their manufacture. More particularly, this invention relates to isolated resonator inertial sensors and microgyroscopes.

2. Description of the Related Art

Mechanical gyroscopes are used to determine direction of a moving platform based upon the sensed inertial reaction of an internally moving proof mass. A typical electromechanical gyroscope comprises a suspended proof mass, gyroscope case, pickoffs, torquers and readout electronics. The inertial proof mass is internally suspended from the gyroscope case that is rigidly mounted to the platform and communicates the inertial motion of the platform while otherwise isolating the proof mass from external disturbances. The pickoffs to sense the internal motion of the proof mass, the torquers to maintain or adjust this motion and the readout electronics that must be in close proximity to the proof mass are internally mounted to the case which also provides the electrical feedthrough connections to the platform electronics and power supply. The case also provides a standard mechanical interface to attach and align the gyroscope with the vehicle platform. In various forms gyroscopes are often employed as a critical sensor for vehicles such as aircraft and spacecraft. They are generally useful for navigation or whenever it is necessary to autonomously determine the orientation of a free object.

Older conventional mechanical gyroscopes were very heavy mechanisms by current standards, employing relatively large spinning masses. A number of recent technologies have brought new forms of gyroscopes, including optical gyroscopes such as laser gyroscopes and fiberoptic gyroscopes as well as mechanical vibratory gyroscopes.

Spacecraft generally depend on inertial rate sensing equipment to supplement attitude control. Currently this is often performed with expensive conventional spinning mass gyros (e.g., a Kearfott inertial reference unit) or conventionally-machined vibratory gyroscopes (e.g. a Litton hemispherical resonator gyroscope inertial reference unit). However, both of these are very expensive, large and heavy.

In addition, although some prior symmetric vibratory gyroscopes have been produced, their vibratory momentum is transferred through the case directly to the vehicle platform. This transfer or coupling admits external disturbances and energy loss indistinguishable from inertial rate input and hence leads to sensing errors and drift. One example of such a vibratory gyroscope may be found in U.S. Pat. No. 5,894,090 to Tang et al. which describes a symmetric cloverleaf vibratory gyroscope design and is hereby incorporated by reference herein. Other planar tuning fork gyroscopes may achieve a degree of isolation of the vibration from the baseplate, however these gyroscopes lack the vibrational symmetry desirable for tuned operation.

In addition, shell mode gyroscopes, such as the hemispherical resonator gyroscope and the vibrating thin ring gyroscope, are known to have some desirable isolation and vibrational symmetry attributes. However, these designs are not suitable for or have significant limitations with thin planar silicon microfabrication. The hemispherical resonator employs the extensive cylindrical sides of the hemisphere for sensitive electrostatic sensors and effective actuators. See, e.g. U.S. Pat. No. 4,951,508, by Loper, Jr. et al., which is hereby incorporated by reference herein. However its high aspect ratio and 3D curved geometry is unsuitable for inexpensive thin planar silicon microfabrication. The thin ring gyroscope (e.g., U.S. Pat. No. 6,282,958, which is incorporated by reference herein) while suitable for planar silicon microfabrication, lacks electrostatic sensors and actuators that take advantage of the extensive planar area of the device. Moreover, the case for this gyroscope is not of the same material as the resonator proof mass so that the alignment of the pickoffs and torquers relative to the resonator proof mass change with temperature, resulting in gyroscope drift.

Another silicon resonating ring gyroscope, developed by Silicon Sensing Systems, is a silicon resonating ring gyro that is electromagnetically driven and sensed.

Vibration isolation using a low-frequency seismic support of the case or of the resonator, internal to the case is also known (e.g., U.S. Pat. No. 6,009,751, which is incorporated by reference herein). However such increased isolation comes at the expense of proportionately heavier seismic mass and/or lower support frequency. Both effects are undesirable for compact tactical inertial measurement unit (IMU) applications because of proof mass misalignment under acceleration conditions.

Furthermore, the scale of previous silicon microgyroscopes (e.g., U.S. Pat. No. 5,894,090) can not been optimized for navigation or pointing performance resulting in higher noise and drift than desired. This problem stems from dependence on out of plane bending of thin epitaxially grown silicon flexures to define critical vibration frequencies that are limited to 0.1% thickness accuracy. Consequently device sizes are commonly limited to a few millimeters. Such designs exhibit high drift due to vibrational asymmetry or unbalance and high rate noise due to lower mass which increases thermal mechanical noise and lower capacitance sensor area which increases rate errors due to sensor electronics noise.

Scaling up of non-isolated silicon microgyros is also problematic because external energy losses will increase with no improvement in resonator Q and no reduction in case-sensitive drift. An isolated cm-scale resonator with many orders of magnitude improvement in 3D manufacturing precision is required for very low noise pointing or navigation performance.

Conventionally machined navigation grade resonators such as quartz hemispherical or shell gyros have the optimum noise and drift performance at large scale, e.g. 30 mm and 3D manufacturing precision, however such gyros are expensive and slow to manufacture. Micromachined silicon vibratory gyroscopes have lower losses and better drift performance at smaller scale but pickoff noise increases and mechanical precision decreases at smaller scale so there are limits to scaling down with conventional silicon designs. Conventional laser trimming of mechanical resonators can further improve manufacturing precision to some degree. However, this process is generally not suitable for microgyros with narrow mechanical gaps and has limited resolution, necessitating larger electrostatic bias adjustments in the final tuning process.

Micromachined Coriolis gyroscopes to date have not achieved the approximately less than 1°/hour accuracy required for inertial navigation applications, in part because of non-optimized designs and packaging. The choice of materials used for the sensor construction also contributes to the rotation measurement error.

There is a need in the art for small gyroscopes with greatly improved performance for navigation and spacecraft payload pointing. There is also a need for such gyros to be scalable to smaller, less expensive and more easily manufactured designs with lower mechanical losses in silicon and greater 3D mechanical precision for lower gyro drift. There is still further a need for such gyros to have desirable isolation and vibrational symmetry attributes while being compatible with planar quartz manufacturing. There is a need for the gyroscope resonator and case to be made of the same material and allowing close proximity of pickoffs, torquers and readout electronics. Finally, there is a need for such gyros to provide adequate areas for sensing and drive elements in a compact form for lower gyro noise at small scale. As detailed below, the present invention satisfies these and other needs.

SUMMARY OF THE INVENTION

Some embodiments of the present invention address the aforementioned issues by incorporating a symmetric design with low anchor losses, a high Q resonator material (e.g. fused quartz) with low thermoelastic damping, a wafer-level vacuum package with minimal thermal stress, and large active structures to increase signal-to-noise level. One feature is the use of highly conformal thin conductive coatings on the fused quartz for maintaining the inherent high Q of the resonator. In addition, the resonator may be processed on a quartz handle wafer for improved sidewall control during etching and for reduced electrical substrate damage during etching. Embodiments of the micromachined gyroscope described herein can drastically reduce the cost, size and weight of a satellite stabilization system. In addition, embodiments of the invention may be applied to antenna stabilization systems, unmanned aerial vehicles (UAVs) and global positioning system (GPS) aided navigation systems.

Embodiments of the present invention are directed to apparatuses and methods of making a micromachined all-quartz resonator gyroscope, e.g. a disc resonator gyro (DRG), including one or more of the following novel features. Embodiments of the invention may comprise a triple-wafer stack gyroscope with an all-fused quartz construction for an electrical baseplate, resonator and vacuum cap. This can yield superior thermal stability over prior art designs. A typical resonator embodiment may include a centrally anchored disc with high aspect-ratio in-plane electrostatic drive and sense electrodes to create large capacitance. A silicon sacrificial layer may be employed for attaching a quartz resonator wafer to a quartz handle wafer for high aspect-ratio etching. In addition, embodiments of the invention may comprise a low thermal stress, wafer-level vacuum packaged gyroscope with on-chip getter. An ultra-thin conductive layer deposited on the quartz resonator may also be utilized for high Q.

One embodiment of the present invention may be described as a planar version of a hemispherical resonator with the shell structure of the "wine glass" collapsed into a disc. Since its structure is planar, batch micro-fabrication techniques can be utilized in manufacturing. Embodiments of the invention may have twenty or more concentric rings interconnected to make up the disc. This is in contrast to the single ring employed in conventional ring resonator gyroscope. Embodiments of the invention employ novel quartz processing and thin film deposition techniques to produce a high performance fused quartz disc resonator gyroscope. Deep reactive ion etching of quartz with high precision (i.e., straight and smooth sidewalls) and conformal ultra thin (e.g., 10-20 nm thick) conductive layer deposition with high fabrication symmetry and uniformity are employed to yield the high performance, e.g. at or exceeding the hemispherical resonator gyroscope. Fused quartz construction allows the Q to be increased by several orders of magnitude compared to Silicon construction due to low thermoelastic damping. In turn, this reduces the bias and bias drift of the gyroscope since a much smaller drive signal is required for similar rotational sensitivity, and higher Q drives the bias and bias stability to lower levels for similar Q stability.

Further embodiments of the invention are directed to a disc resonator gyroscope (DRG) and related manufacturing process. The gyroscope may comprise a triple-wafer stack gyroscope with an all-silicon construction for the electrical baseplate, resonator and vacuum cap to achieve superior thermal stability. The resonator may comprise a centrally anchored disc with high aspect ratio, in-plane electrostatic drive and sense electrodes to yield large capacitance. In addition, a low thermal stress, wafer-level vacuum packaging process may be employed to develop the DRG with an on-chip getter that is decoupled from the resonator fabrication.

A typical embodiment of the invention comprises a sensor including a disc resonator having a central support, a baseplate wafer for supporting the disc resonator at the central support, and a cap wafer covering the disc resonator. The baseplate wafer and the cap wafer comprise an enclosure of the disc resonator and the cap wafer comprises a single wafer having a cavity forming a wall surrounding the disc resonator and the wall is bonded to the baseplate wafer to enclose the disc resonator. The baseplate wafer and the cap wafer may enclose the disc resonator under a vacuum seal. In addition, the disc resonator may include a plurality of circumferential slots and electrodes for driving the disc resonator and sensing motion of the disc resonator occupy at least some of the plurality of circumferential slots where the electrodes are supported by the baseplate wafer.

The electrodes for driving the disc resonator and sensing motion of the disc resonator may be electrically coupled to electrical interconnects patterned on the baseplate wafer and passing under the wall of the cap wafer. Furthermore, the electrical interconnects may be electrically coupled to control electronics on an exterior surface of the baseplate wafer.

Further embodiments of the invention may employ an on-chip getter within the enclosure. The on-chip getter may be activated with the baseplate and cap wafer in near separation before vacuum sealing the enclosure.

In addition, both the disc resonator and electrodes for driving the disc resonator and sensing motion of the disc resonator can be formed by through etching the resonator wafer. Through etching the resonator wafer may comprise deep reactive ion etching (DRIE).

In some embodiments, the disc resonator, the baseplate wafer and the cap wafer may each comprise quartz and the disc resonator and the electrodes are formed by through etching a quartz resonator wafer bonded to a handle wafer. The handle wafer may be removed after aligning and bonding the formed disc resonator to the baseplate wafer. In other embodiments, the disc resonator, the baseplate wafer and the cap wafer may each comprise silicon and the disc resonator and the electrodes are formed by through etching a silicon resonator wafer bonded to the baseplate wafer.

Similarly, a typical method of producing a sensor, includes the steps of producing a disc resonator having a central support, producing a baseplate wafer for supporting the disc resonator at the central support, producing a cap wafer covering the disc resonator, the cap wafer comprising a single wafer having a cavity forming a wall surrounding the disc resonator, and bonding the wall to the baseplate wafer to enclose the disc resonator where the baseplate wafer and the cap wafer comprise an enclosure of the disc resonator. Method embodiments of the invention may be further modified consistent with the apparatus embodiments described herein.

BRIEF DESCRIPTION OF THE DRAWINGS

Referring now to the drawings in which like reference numbers represent corresponding elements throughout:

FIG. 1B describes the operation of a disc resonator for an all-quartz resonator gyroscope;

FIG. 3I is a flowchart of an exemplary method of manufacturing a resonator wafer for an all-quartz resonator gyroscope;

DETAILED DESCRIPTION OF THE PREFERRED EMBODIMENT

Figure 1A:
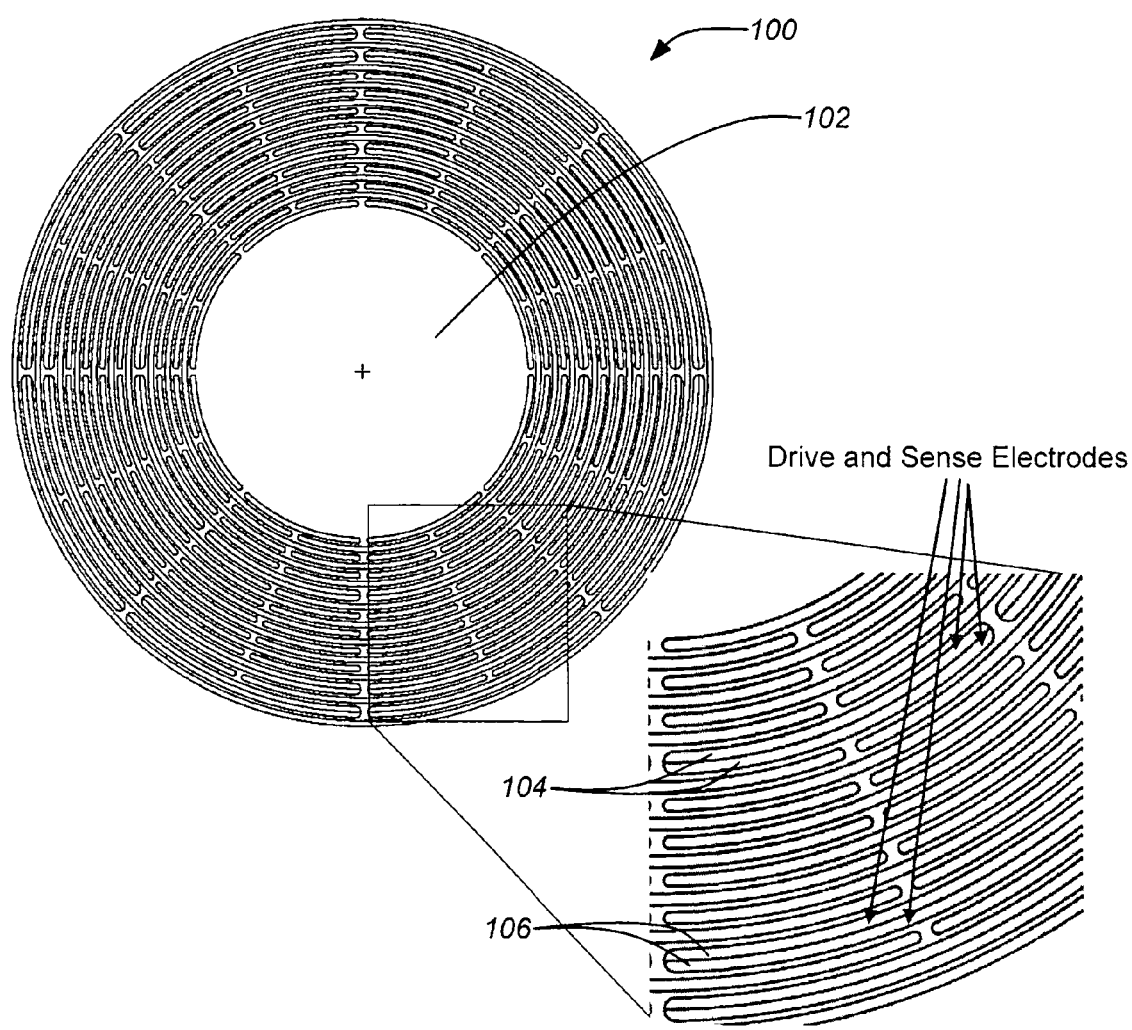
FIG. 1A shows a typical disc resonator architecture for an all-quartz resonator gyroscope.

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

1. Overview

One significant factor in the material selection for a resonator (and overall gyroscope) is the impact of the material on energy loss for the device. The fundamental energy loss mechanism in a resonating solid has been previously proposed by Zener in 1948 to be thermalelastic damping.

$$Q_{TE} = Q_o \left[ \frac{1 + (\omega\tau)^2}{2(\omega\tau)^2} \right] \qquad (1)$$

$$Q_o = \frac{2C_v}{E\alpha^2 T_o} \qquad (2)$$

where, $C_v$=specific heat capacity, E=Young's modulus, $\alpha$=coefficient of thermal expansion, $T_o$=nominal resonator temperature, $\tau$=thermal relaxation time, and $\omega=2\pi\text{x}$(frequency of oscillation). In equation (1), $Q_0$ is material and temperature dependent whereas the term multiplied by $Q_0$ is geometry dependent (incorporating thermal relaxation time and frequency). Thus, for a given resonator design and a fixed temperature, the quality factor. $Q_{TE}$, is strongly material dependent. It can be seen from the values in the following table that a very high quality factor is achieved with fused silica (glassy isotropic quartz) as applied in the quartz DRG of the present invention.

|  | Silicon | Crystalline Diamond | Crystalline Quartz | Fused Silica |
| --- | --- | --- | --- | --- |
| α (1/deg C.) | 2.5e-6 | 1.2e-6 | 8.1e-6 | 5.5e-7 |
| $Q_0$ | 10,000 | 16,500 | 795 | 855,000 |

Quartz-based MEMS resonator technology has been successfully applied to VHF-UHF nanoresonators. For example, some quartz nanoresonators have been implemented on silicon substrates (e.g. a 1.9 GHz resonator has obtained a Q of approximately 7250). The high quality factor of UHF nanoresonators demonstrates the existing ability to control surface roughness and surface damage on the nanometer scale. Identifying the material advantages attendant to the implementation of a quartz resonator coupled with the available quartz manufacturing processes, embodiments of the present invention present a significant performance improvement over the prior art.

As mentioned above, embodiments of the present invention are directed to apparatuses and methods of making a micromachined all-quartz resonator gyroscope, e.g. a disc resonator gyro (DRG), including one or more of the following novel features. Embodiments of the invention may comprise a triple-wafer stack gyroscope with an all-fused quartz construction for an electrical baseplate, resonator and vacuum cap. This can yield superior thermal stability over prior art designs. A typical resonator embodiment may include a centrally anchored disc with high aspect-ratio in-plane electrostatic drive and sense electrodes to create large capacitance. An amorphous silicon sacrificial layer may be employed for attaching a quartz resonator wafer to a quartz handle wafer for high aspect-ratio etching. In addition, embodiments of the invention may comprise a low thermal stress, wafer-level vacuum packaged gyroscope with on-chip getter. An ultra-thin conductive layer deposited on the quartz resonator may also be utilized for high Q.

1. Disc Resonator Gyroscope Architecture

A disc resonator gyroscope (DRG) architecture has been previously described in U.S. Pat. Nos. 6,944,931 to Shcheglov et al. and 7,040,163 to Shcheglov et al., which are both incorporated by reference herein. However, the present invention adopts a similar architecture applied in an all-quartz gyroscope implementation. Furthermore, further embodiments of the present invention incorporate novel features applicable to DRG of any material. For example, embodiments of the present invention incorporate a resonator enclosure using a cap wafer that includes a wall forming a cavity for the resonator.

FIG. 1A shows a typical disc resonator 100 architecture for an all-quartz resonator gyroscope. A typical embodiment of the invention comprises a gyroscope including a planar disc resonator 100 fabricated of fused quartz in which deep reactive ion etching may be used to slot the disc into a system of interconnected rings supported at a central support 102 with internal drive and sense electrodes 104, 106. The internal drive and sense electrodes 104, 106 are formed from the quartz material left in the circumferential slots of the disc resonator 100. The drive and sense electrodes 104, 106 are electrostatic and may operate in paired halves within a single slot, e.g. an inner half and outer half divided along the length of the slot. Thus, the drive and sense electrodes 104, 106 generally interact with the disc resonator in the plane of the disc across narrow gaps between the electrodes 104, 160 and the disc structure. Location of the drive and sense electrodes 104, 106 can be varied, however, it is desirable to position the sense electrodes 106 towards the outside edge of the disc resonator 100 to enhance sensitivity. Both the central support 102 and the drive and sense electrodes 104, 106 are supported at high spots on an etched quartz baseplate. Electrical connections to the drive and sense electrodes 104, 106 can be achieved through an etched metallic layer deposited on the etched quartz baseplate as described hereafter. Additional bias (or trim) electrodes may also be employed to assist in tuning the resonator and improving overall performance. The bias electrodes are incorporated into the structure along with the drive and sense electrodes and are used for tuning the frequency of the modes electrostatically for optimal performance. Embodiments of the invention are operable with any planar resonator design which may incorporate a unique architecture comprising drive and sense electrodes as well as bias electrodes. Embodiments of the invention are not limited to any particular resonator architecture.

The disc resonator 100 can operate in manner similar to a "wine-glass" vibrational mode by using solid disc vibrational modes. The centrally mounted resonator supports two degenerate elastic inertial waves for Coriolis sensing having zero momentum relative to the baseplate, so that all of the modal momentum remains locked within the resonating medium. The central support 102 provides support at a node of the system and therefore minimizes mechanical losses. This feature eliminates noisy and non-repeatable anchor losses and, with appropriate geometric design of the resonator, allows very high and very stable mechanical quality defined only by predictable material damping. This very high quality, and precise photolithographically-defined symmetry leads to inherently low gyro bias (and therefore low bias drift), which can be highly repeatable and predictable over the temperature extremes. Relative machining precision may be increased by making the device at mesoscale (i.e. approximately 1 cm diameter resonator). An appropriate low thermal conductivity material such as quartz operating together with wide precision mesoscale flexures can ensure very low thermoelastic damping and a high resonator mechanical quality factor (Q of approximately 1 million to 10 million) as previously described.

FIG. 1B describes the operation of a disc resonator for an all-quartz resonator gyroscope. The left panel illustrates an analytical model of a typical disc resonator. The right panel illustrates typical operation of a DRG. In operation, the disc resonator is excited such that a standing wave vibration pattern (which may be likened to the "wine glass" mode of the known hemispherical resonator gyroscope) moves in response to rotation of the gyroscope case as shown in the right image. Coriolis forces couple two degenerate modes of the disc to yield a new standing wave pattern after rotation of the DRG. In the example shown, under a case rotation (i.e. rotation of the entire DRG) of 90 degrees, the standing wave pattern shifts approximately 60 degrees (90 degrees less a 30 degree shift). As described above, the disc resonator architecture may comprise an axisymmetric resonator supported at a central node. A large number of circumferential slots occupied by the drive and sense electrodes 104, 106 provide large area for capacitive electrode actuation and sensing yielding a large signal to noise (S/N) ratio. The architecture lends itself to simple two dimensional design, homogeneous material and batch fabrication and inexpensive manufacturing.

Figure 1C:
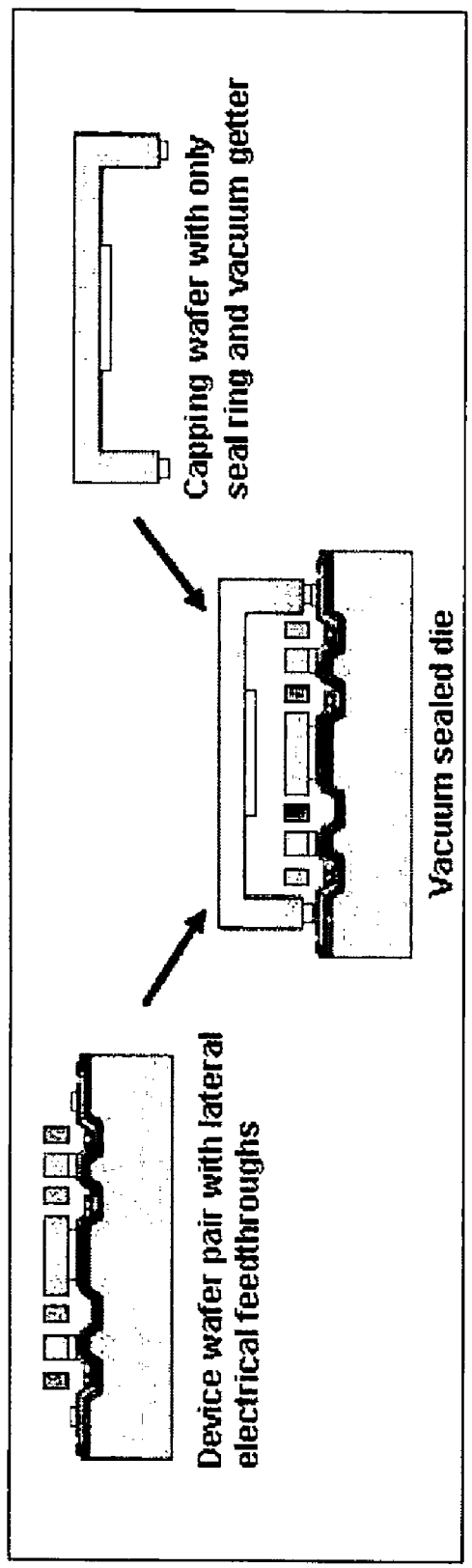
FIG. 1C illustrates the configuration of an all-quartz disc resonator gyroscope including vacuum sealing.

FIG. 1C illustrates the overall configuration of an all-quartz disc resonator gyroscope including vacuum sealing which will be detailed hereafter. The all quartz construction of the disc resonator, baseplate wafer, and cap wafer provides a design with low temperature sensitivity. The handle wafer employed in manufacturing helps minimize debris, shorting and footing issues. The use of atomic layer deposition (ALD) through microelectromechanical system (MEMS) exchange may be used to provide an ultra-thin, low loss conductive coating. An Au—Au thermo-compression bond may be employed for resonator attachment to the baseplate using 3 µm accuracy for the critical bonding step. In addition, device wafer pair fabrication can be fully decoupled from vacuum sealing to enable early wafer-level vacuum testing of the gyroscope.

U.S. Pat. No. 6,915,215 to M'Closkey et al., which is incorporated by reference herein, describes exemplary control architectures for DRG embodiments described herein such as the all-quartz disc resonator gyroscope. Control of a DRG can be accomplished through the use of bulk complementary metal oxide semiconductor (CMOS) low power digital control circuit (e.g., an application specific integrated circuit [ASIC]) and/or a silicon-on-insulator (SOI) CMOS analog interface in the exemplary circuit designs described therein.

Figure 1D:
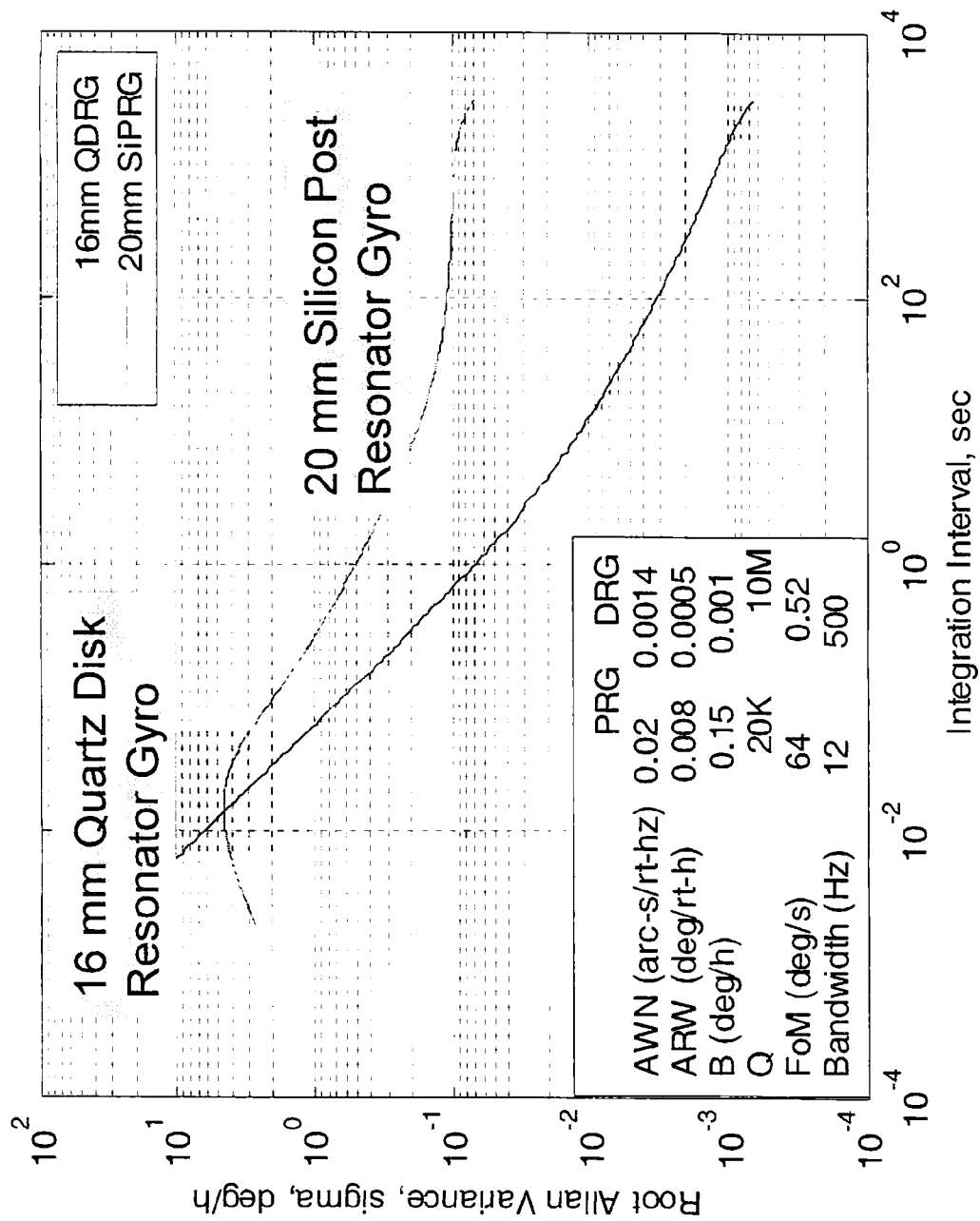
FIG. 1D illustrates performance of an exemplary all-quartz disc resonator gyroscope.

FIG. 1D illustrates performance of an exemplary all-quartz disc resonator gyroscope. The performance gain of an exemplary all-quartz disc resonator gyroscope over a comparable silicon post resonator gyroscope is shown in the sample plot. Prior art post resonator gyroscopes operate using rocking modes of post fixed to a planar electrostatically driven and sensed plate. One example is described in U.S. Pat. No. 5,894, 090 to Tang et al., which is incorporated by reference herein.

2. All-Quartz Disc Resonator Gyroscope and Manufacturing Process

Four fused quartz wafers may be used to form the vacuum-sealed disc resonator gyroscope (DRG). One quartz wafer can serve as a temporary handle for the quartz resonator wafer processing of the another quartz wafer. The two remaining quartz wafers can be used as a vacuum cap and an electrical baseplate, respectively. It should be noted that in description hereafter exemplary embodiments of the invention are illustrated through a two-dimensional side view cross sections showing the processes for developing the basic electrical and structural elements involved. Those skilled in the art will understand application of those processes to the exemplary disc resonator architecture of FIG. 1A or other planar resonators.

Figure 2A:
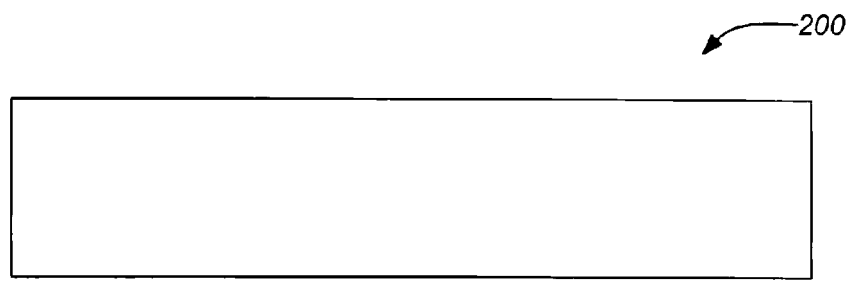
FIGS. 2A-2F illustrate a manufacturing process of a baseplate wafer for an all-quartz resonator gyroscope.
Figure 2B:
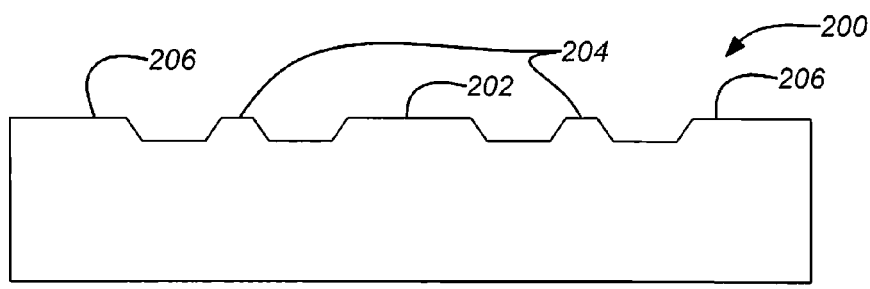
Figure 2C:
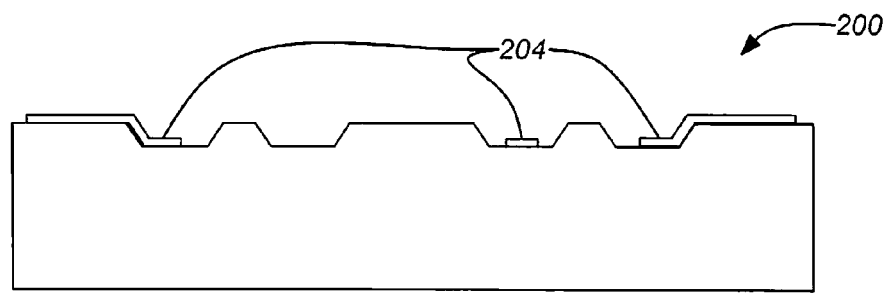
Figure 2D:
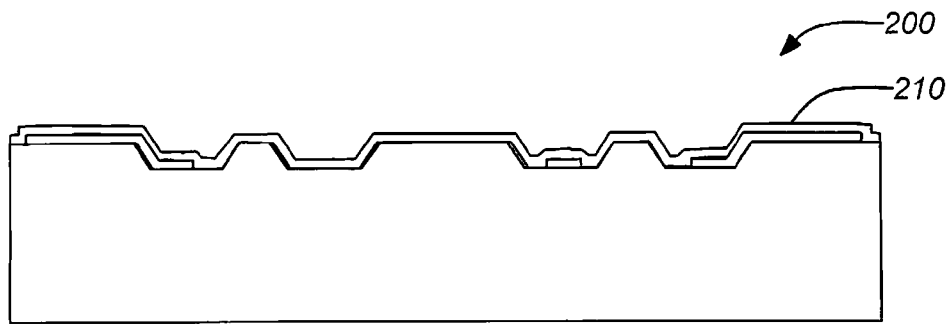
Figure 2E:
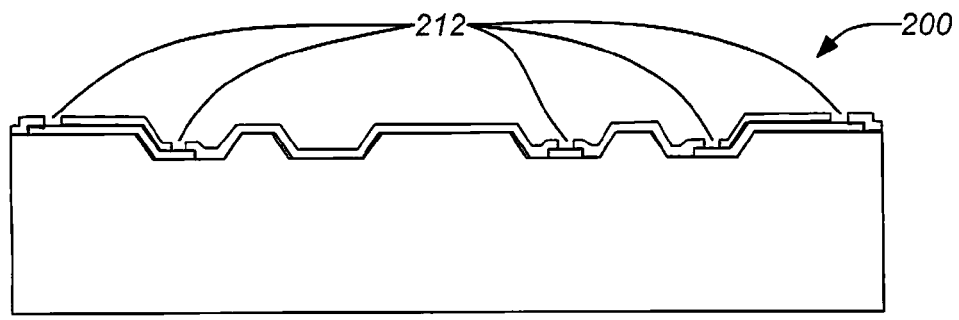
Figure 2F:
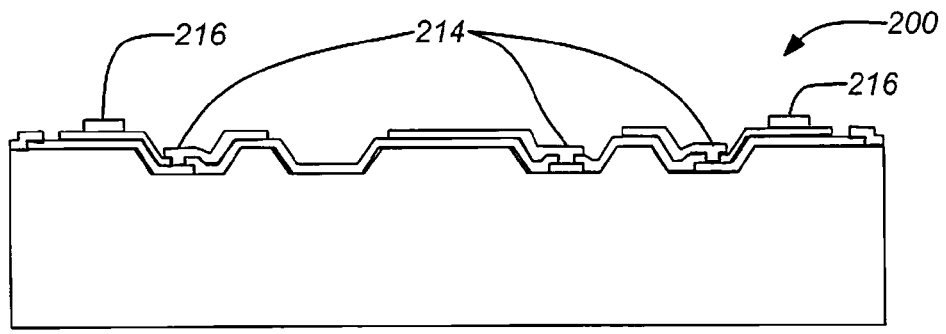

FIGS. 2A-2F illustrate a manufacturing process of a complete baseplate wafer for use in an all-quartz resonator gyroscope in sequence. The quartz baseplate wafer fabrication begins with a recess etch of the fused quartz wafer 200 as shown in FIG. 2B using either a fluorine-chemistry plasma or hydrofluoric acid process or any other known process capable of etching quartz to yield the appropriate pattern (e.g. matching the planar resonator layout of FIG. 1A) of recesses leaving high spots for the central support location 202 of the planar resonator and to provide contacts for the electrode locations 204 as well as the DRG case wall location 206 (for the cap wafer detailed hereafter). The etched recesses provide areas in which electrical circuit interconnects can be deposited to appropriately connect the drive and sense electrodes to the control circuitry. Following the etching, Ti/Au or Cr/Au (200 Å/5000 Å) are metallized on the wafer 200 to form the interconnects 208 for the electrodes as shown in FIG. 2C. A plasma enhanced chemical vapor deposition (PECVD) silicon dioxide or silicon nitride (5000 Å) is then deposited to form the inter-metal dielectric layer 210 as shown in FIG. 2D. Reactive ion etching (RIE) may then be used to open vias 212 through the inter-metal dielectric layer 210 as shown in FIG. 2E. A second metallization of Ti/Au or Cr/Au (200 Å/5000 Å) may be used to deposit the metal bond pads 214 and a vacuum seal ring 216 as shown in FIG. 2F. This concludes the baseplate wafer 200 fabrication.

Figure 2G:
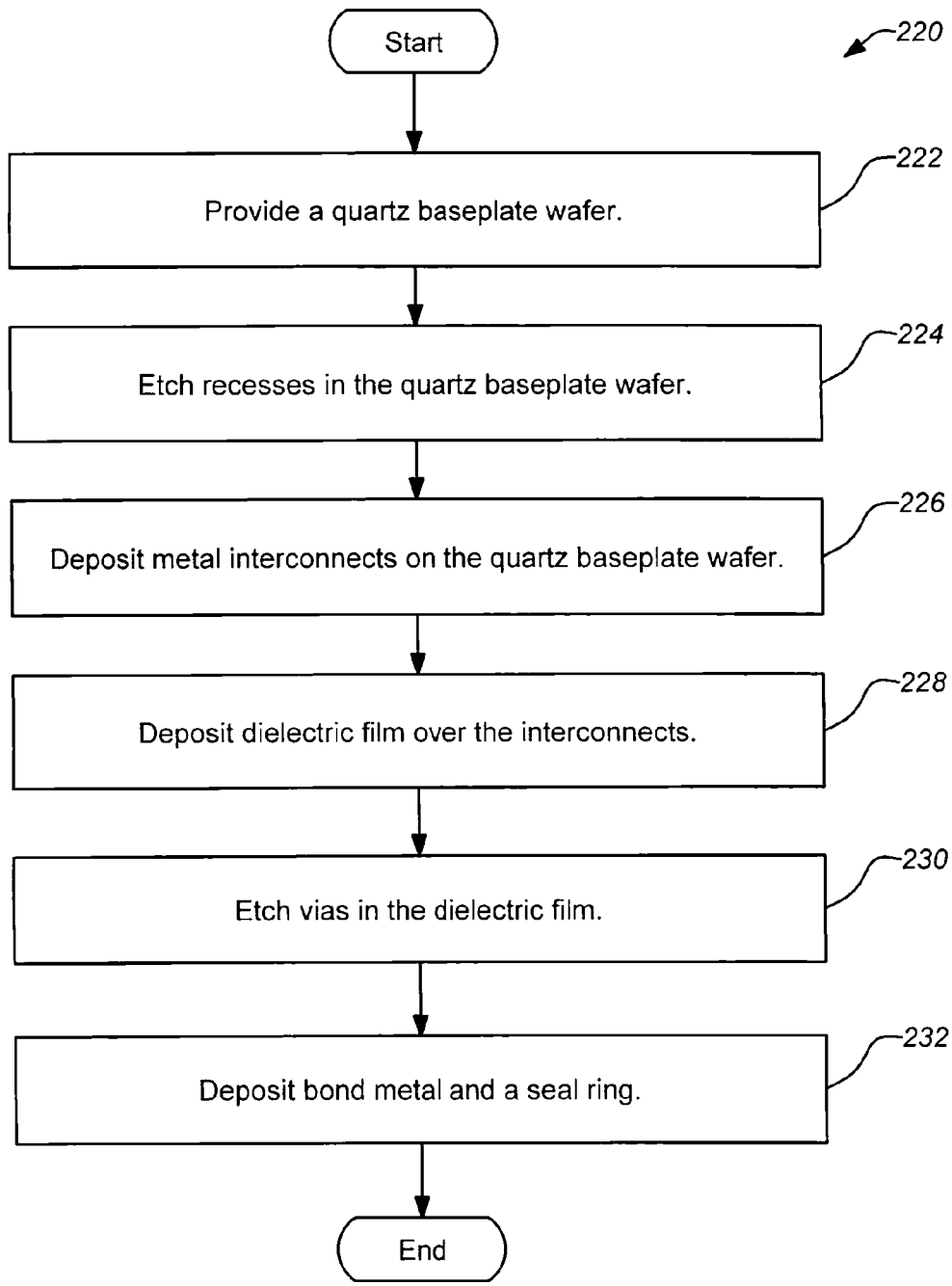
FIG. 2G is a flowchart of an exemplary method of manufacturing a baseplate wafer for an all-quartz resonator gyroscope.

FIG. 2G is a flowchart of an exemplary method 220 of manufacturing a baseplate wafer for an all-quartz resonator gyroscope. In operation 222, a first fused quartz wafer is provided for a baseplate as shown in FIG. 2A. In operation 224, recesses are etched in the fused quartz baseplate as shown in FIG. 2B. In operation 226, metal interconnects are deposited on the fused quartz baseplate as shown in FIG. 2C. In operation 228, dielectric film is deposited over the interconnects as shown in FIG. 2D. In operation 230, vias are etched in the dielectric film as shown in FIG. 2E. And in operation 232, bond metal and a seal ring are deposited as shown in FIG. 2F. The seal ring marks out the periphery of the disc resonator and the bond metal is used to mount the disc resonator at the central support and the electrodes throughout the interior of the disc.

Figure 3A:
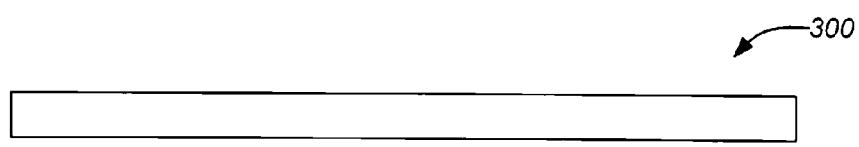
FIGS. 3A-3H illustrate a manufacturing process of a resonator wafer for an all-quartz resonator gyroscope.
Figure 3B:
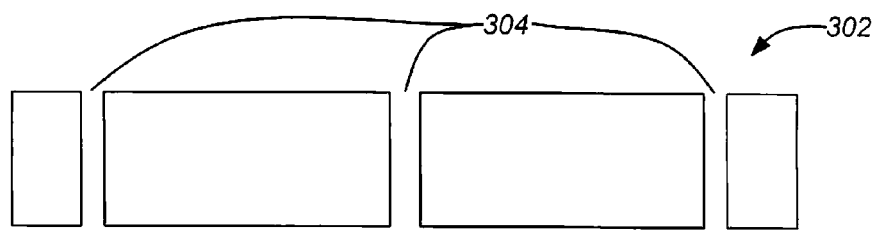
Figure 3C:
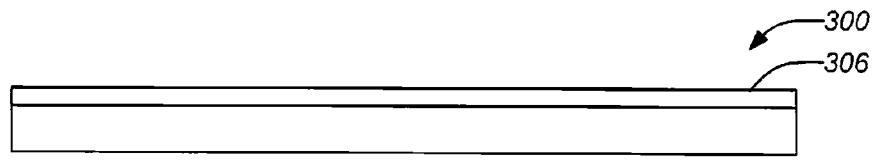
Figure 3D:
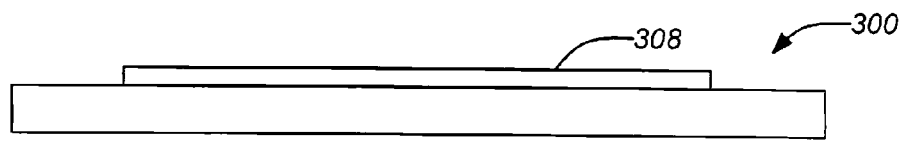
Figure 3E:
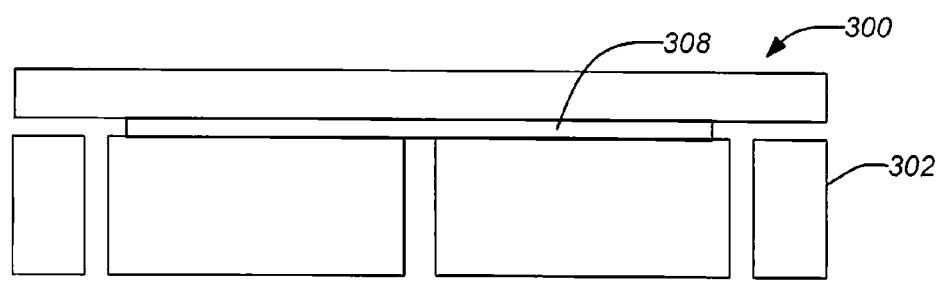

FIGS. 3A-3G illustrate a manufacturing process of a resonator wafer for an all-quartz resonator gyroscope in sequence. The starting materials for the resonator wafer process are a full fused quartz resonator wafer 300 (FIG. 3A) and another fused quartz wafer to be used as a handle wafer 302 (FIG. 3B) having release holes 304 (which may be ultrasonically machined through it). A silicon thin film 306 (approximately 1 μm) is deposited on the resonator wafer 300 using a plasma enhanced chemical vapor deposition (PECVD) as shown in FIG. 3C or using SOI technology as will be understood by those skilled in the art. A chemical mechanical planarization (CMP) step may be carried out if there are any unacceptable surface imperfections due to the deposition. The silicon film may then be patterned 308 using a fluorine chemistry RIE as shown in FIG. 3D in regions that are not required for later bonding the etched resonator to the baseplate wafer. This will speed the final release step. In general, depending upon the applied resonator architecture the pattern will provide enough bonding area in the appropriate locations so that the resonator wafer 300 is stable on the handle wafer 302, but allowing relatively easy release of the handle wafer 302 in later processing. The resonator wafer 300 with patterned silicon film 308 is then bonded to the handle wafer 302 with through holes as shown in FIG. 3E.

Figure 3F:
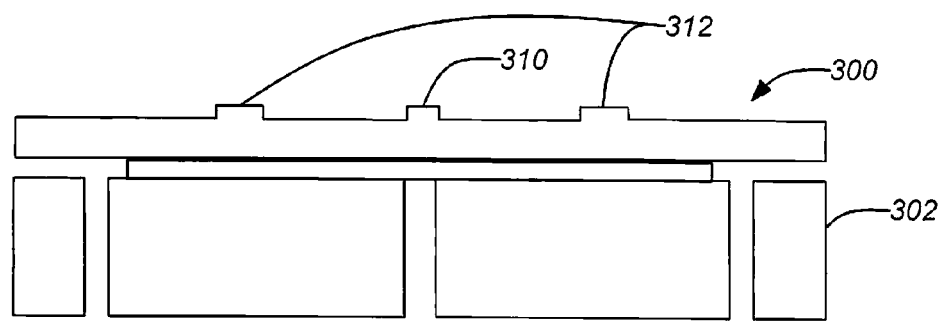

FIG. 3F illustrates an optional process of additional etching of the bottom of the disc resonator wafer 300 as shown. This may be done to form raised areas for the central support location 310 and electrode locations 312 where the baseplate wafer 200 will be bonded in subsequent processing.

Figure 3G:
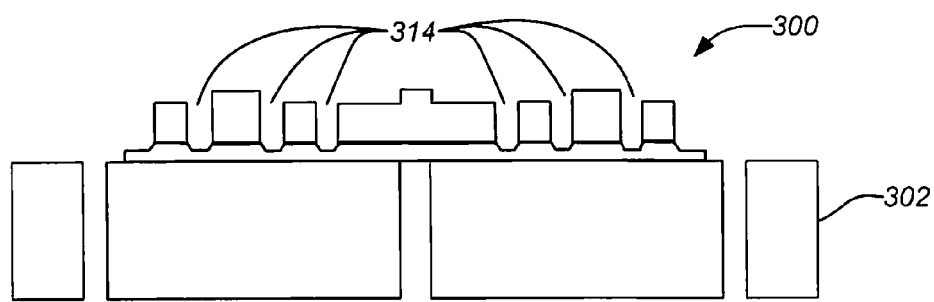
Figure 3H:
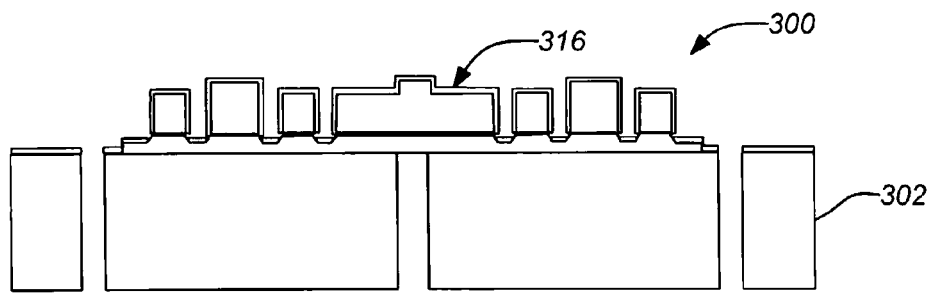
Figure 31:
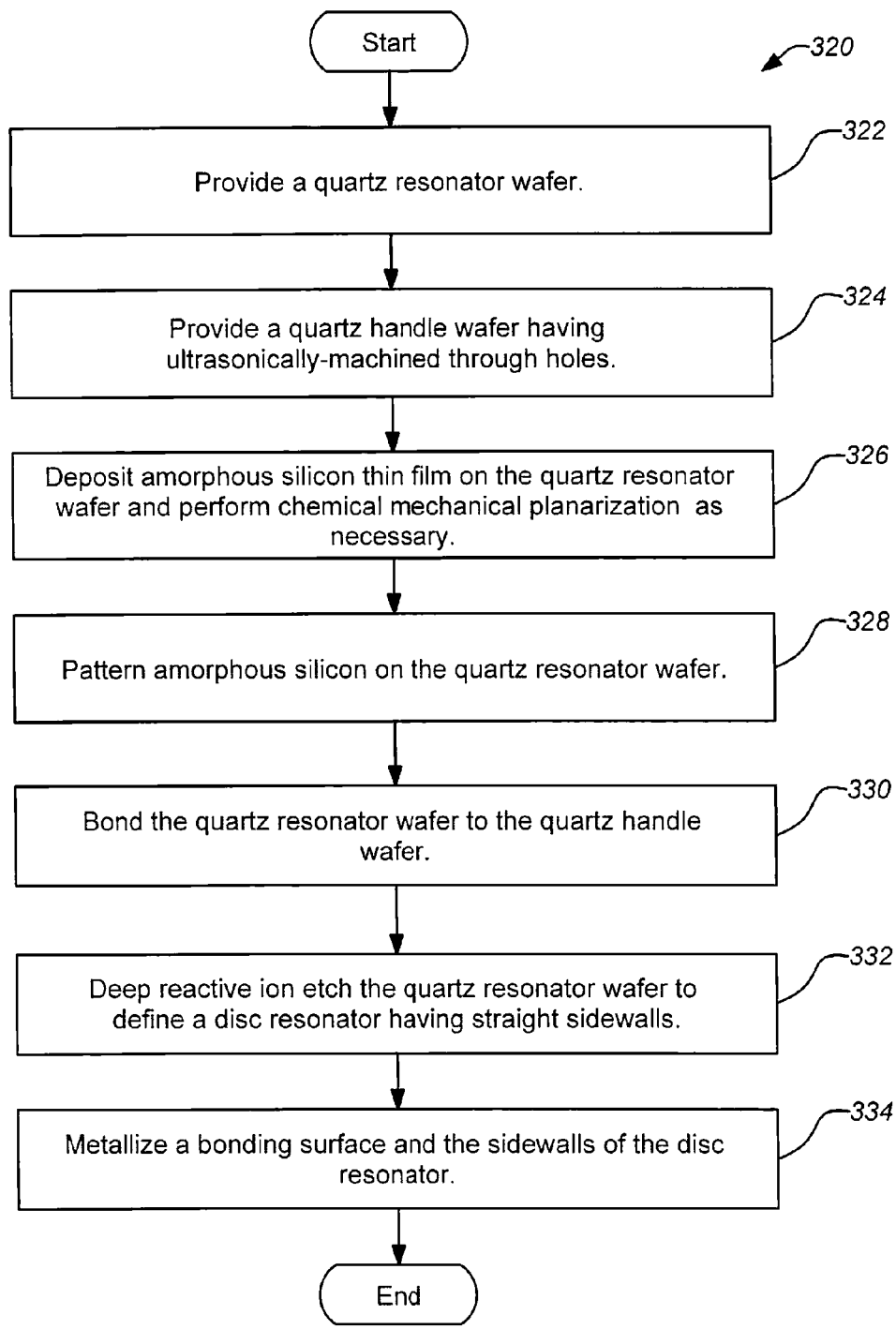

FIG. 3G then illustrates deep reactive ion etching (DRIE) that may be used to define the resonator pattern (e.g. the pattern shown in FIG. 1A) including the electrodes and central support with straight side walls 314 completely through the resonator wafer 300. DRIE of fused quartz defines resonator with straight side walls and minimal surface roughness. Note that the electrodes are now embedded within the resonator wafer 300 but physically disconnected from the resonator structure. Thus, the handle wafer 302 now supports the pattern of resonator structure and electrodes in the resonator wafer 300. The bonding surface of the resonator and the sidewalls may then be metallized 316, e.g. with Al using atomic layer deposition (ALD) or sputtered Au to finish the bottom side processing of the resonator wafer as shown in FIG. 3H. One advantage of the ALD process is that it can provide a conformal and highly uniform coating on the atomic scale. Thus, the thickness of the conductive layer can be reduced to a minimum while maintaining a continuous coating in the high aspect ratio structures. This can help minimize damping due to the conductive layer and reduce stress gradients over temperature due to a non-uniform thickness.

FIG. 3I is a flowchart of a method 320 of manufacturing a resonator wafer for an all-quartz resonator gyroscope. In operation 322, a second fused quartz wafer is provided for the disc resonator as shown in FIG. 3A. In operation 324, a third fused quartz wafer is provide for a handle with ultrasonically-machined through holes as shown in FIG. 3B. In operation 326, amorphous silicon thin film is deposited on the second wafer with chemical mechanical planarization (CMP) performed as necessary as shown in FIG. 3C. In operation 328, silicon is patterned on the second wafer as shown in FIG. 3D. In operation 330, the second wafer is bonded to the third wafer as shown in FIG. 3E. The wafers may be bonded with plasma-assisted room temperature bonding. Operation 332 is an optional process of additional etching of the bottom of the disc resonator wafer for electrode and support contacts as shown in FIG. 3F. In operation 334, the second wafer is deep reactive ion etched (DRIE) to define the disc resonator with straight side walls as shown in FIG. 3G. And in operation 336, the bonding surface and sidewalls of the disc resonator are metallized as shown in FIG. 3H.

Figure 4A:
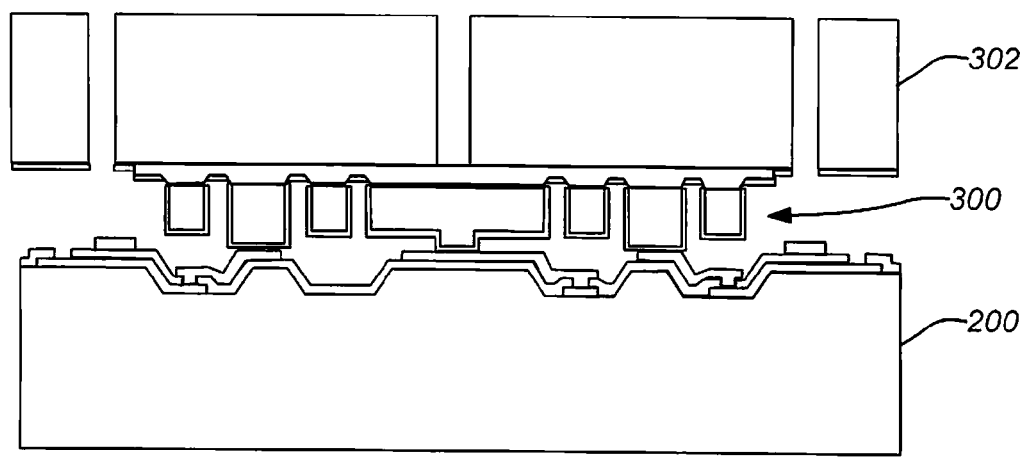
FIGS. 4A-4C illustrate an assembly process of a resonator wafer and baseplate wafer for an all-quartz resonator gyroscope.
Figure 4B:
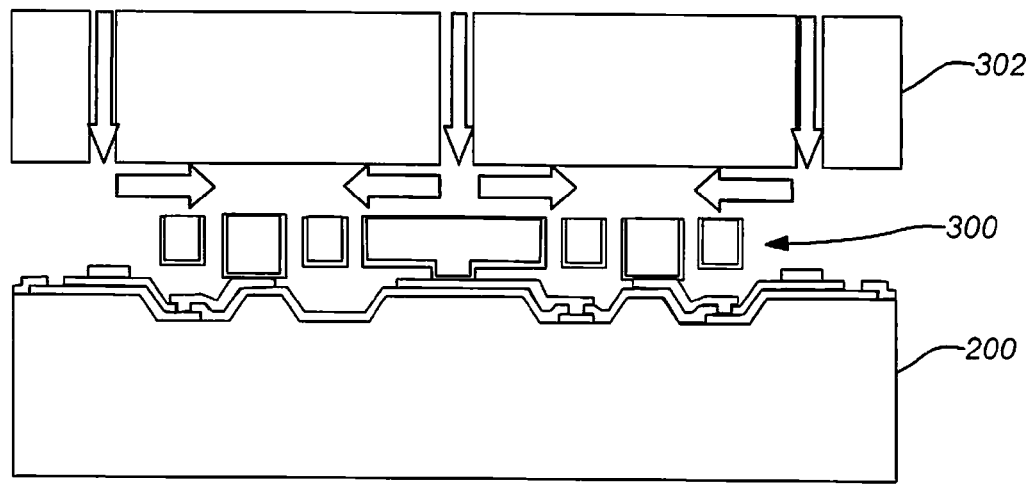
Figure 4C:
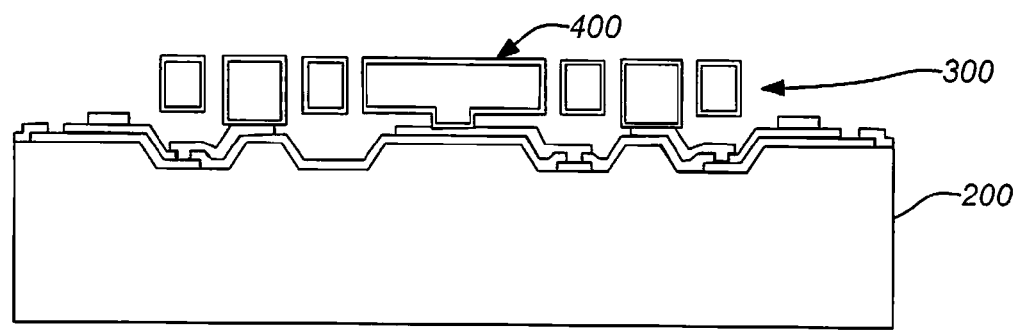

FIGS. 4A-4C illustrate assembly of a resonator wafer and baseplate wafer for an all-quartz resonator gyroscope. The resonator wafer 300 and handle wafer 302 pair are then brought in contact and aligned with the baseplate wafer 200. The resonator wafer 200 and baseplate wafer 300 may be bonded together using metal/metal thermal compression bond the metal bond pads 214 of the baseplate wafer 200 to the central support location 310 and the electrode locations 312 of the resonator wafer 300 as shown in FIG. 4A. Alignment can be performed through the transparent baseplate wafer for ~0.5 μm accuracy. These bonds form the electrical connections to the electrodes and resonator structure. To release the resonator structure from the handle wafer, Xenon difluoride gas (shown by arrows in FIG. 4B) may be passed through the release holes of the handle wafer to undercut the silicon layer complete the transfer of the resonator wafer 300 from the handle wafer 302 to the baseplate 200. The top side of the resonator wafer may then be coated with thin metallic layer 400 (e.g., approximately 10-20 nm thick) Al or Au with angled evaporation to form a completely symmetric structure and prevent shorting of probe pads.

Figure 4D:
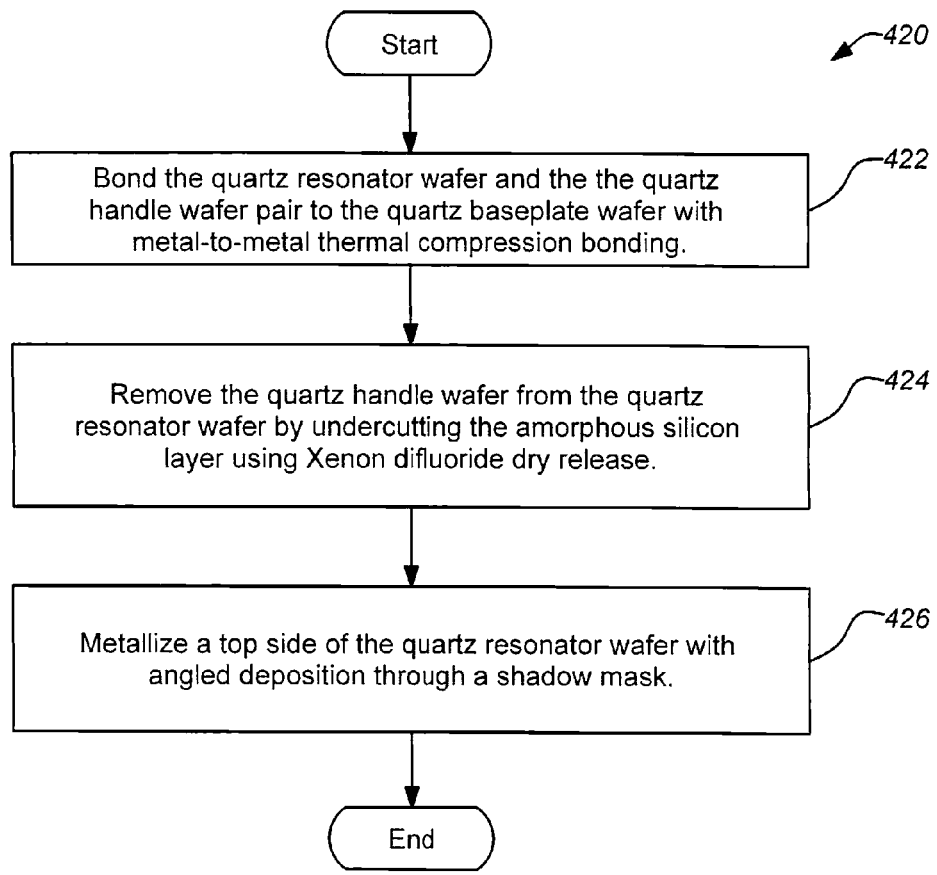
FIG. 4D is a flowchart of an exemplary method of assembling a resonator wafer and baseplate wafer for an all-quartz resonator gyroscope.

FIG. 4D is a flowchart of a method 420 of assembling a resonator wafer and baseplate wafer for an all-quartz resonator gyroscope. In operation 422, the second and the third wafer pair are bonded to the first wafer with metal-to-metal thermal compression bonding as shown in FIG. 4A. Alignment of the second and third wafers may be performed through the transparent first wafer to achieve ~0.5 μm accuracy. In operation 424, the third wafer is removed from the second wafer by undercutting the silicon layer using Xenon difluoride dry release as shown in FIG. 4B. The flow of Xenon difluoride is indicated by the arrows. And in operation 426, the top side of the second wafer is metallized with angled deposition through a shadow mask to prevent shorting of probe pads as shown in FIG. 4C. Thus, the disc resonator is symmetrically coated with a thin conductive layer of metal to allow it to function electrostatically with the electrodes.

Figure 5A:
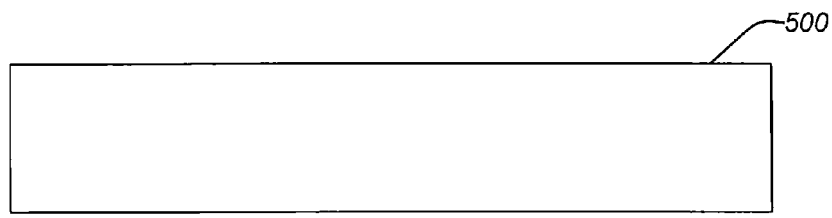
FIGS. 5A-5F illustrate a vacuum sealing process of a resonator wafer and baseplate wafer for an all-quartz resonator gyroscope.
Figure 5B:
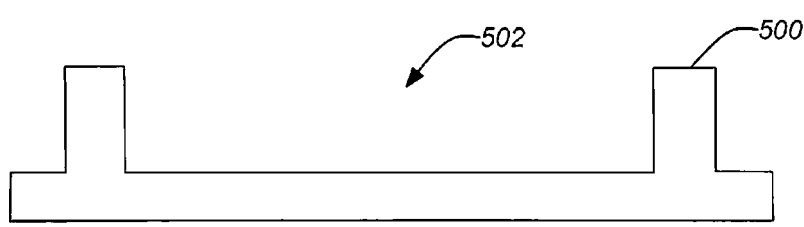
Figure 5C:
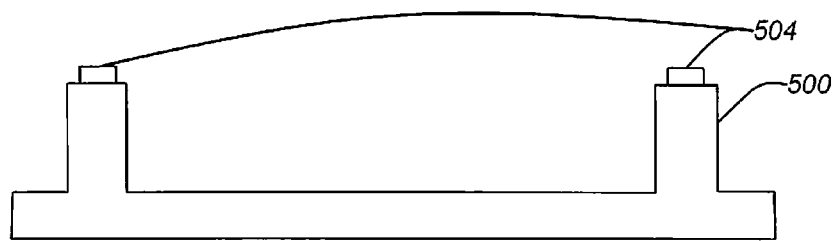
Figure 5D:
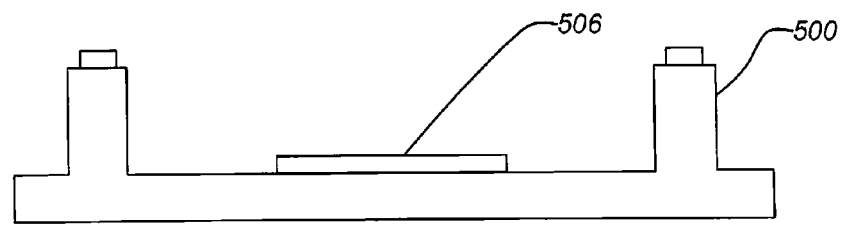
Figure 5E:
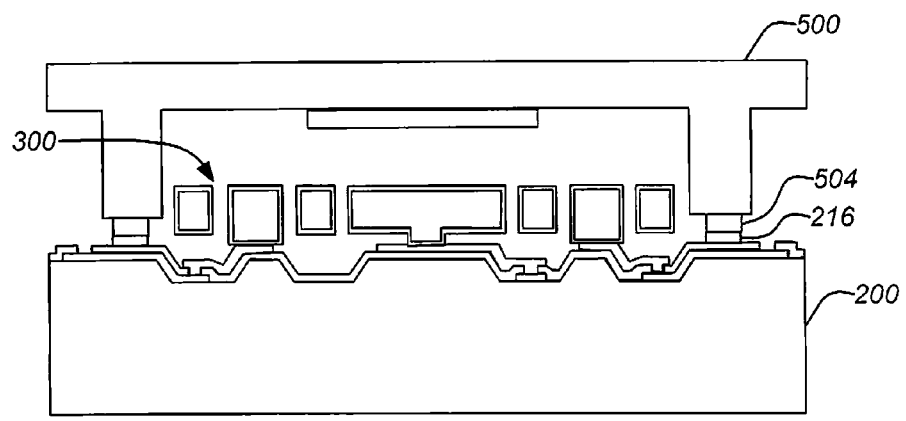
Figure 5F:
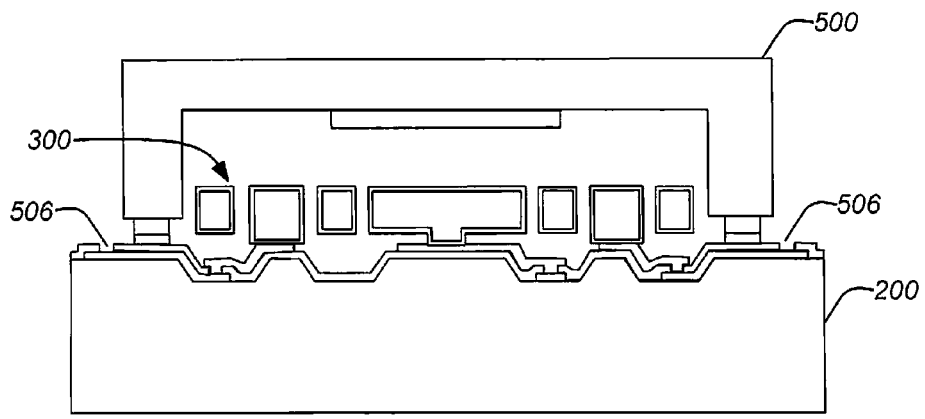

FIGS. 5A-5F illustrate a vacuum sealing process of a resonator wafer 300 and baseplate wafer 200 for an all-quartz resonator gyroscope. The vacuum sealing process begins with a cavity 502 etched into a fused quartz cap wafer 500, e.g. using ultrasonic machining as shown in FIG. 5B. Then indium or tin solder (~5 um thick) may be deposited using spray coating lithograph) and lift-off to form a metal bond line 504 around the perimeter of the cavity 502 as shown in FIG. 5C. A vacuum getter 506 may then be deposited into the cavity using a shadow mask as shown in FIG. 5D. For example the vacuum getter may comprise a titanium-based thin film getter or any similar getter material compatible with the structure and processes defined herein. The cap wafer 500 is brought to the resonator wafer 300 and baseplate wafer 200 pair and aligned using a bond aligner known in the art. For example, a bond aligner system from Electronic Vision Group or other similar systems may be applied to properly bond the wafers properly aligned to one another. The cap wafer 500 may be temporarily kept in near separation from the resonator wafer 300 and baseplate wafer 200 pair with 50 μm-thick spacers. This three-wafer stack is then transferred to a wafer bonder so that the cavity of the cap wafer 500 can be evacuated through the gap created by the 50 μm-thick spacers. Once vacuum is achieved inside the cavity, the vacuum getter may be heated to approximately 350° C. for activation. The 50 μm-thick spacers may then be removed to contact the metal bond line 504 of the cap wafer 500 to the vacuum seal ring 216 of the baseplate wafer 200 to form the vacuum seal with the solder as shown in FIG. 5E. Note that the electrical interconnects to the resonator and electrodes pass under the vacuum seal. Finally, the cap wafer 500 may be ultrasonically machined to create access to the probe pads to the electrical interconnects of the gyroscope as shown in FIG. 5F.

Figure 5G:
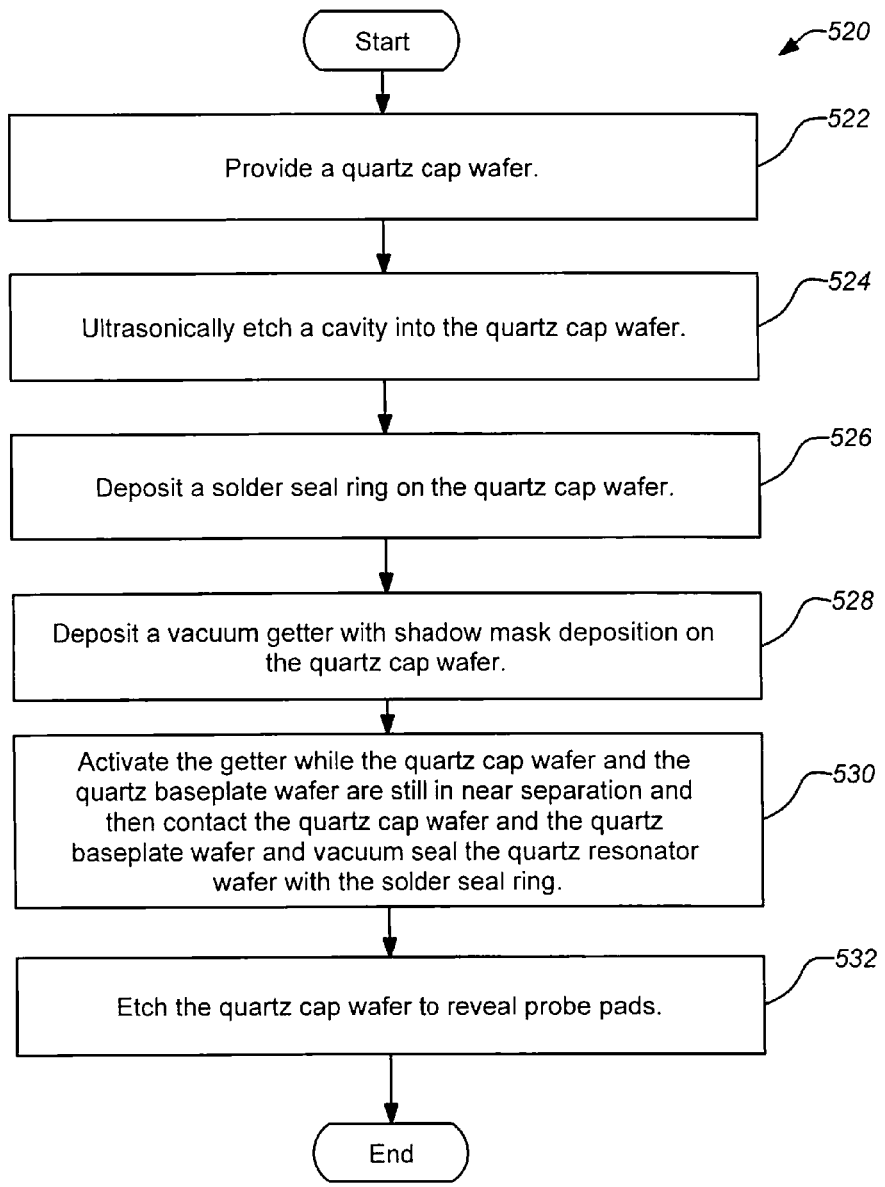
FIG. 5G is a flowchart of an exemplary method of vacuum sealing a resonator wafer and baseplate wafer for an all-quartz resonator gyroscope.

FIG. 5G is a flowchart of a vacuum sealing method 520 of a resonator wafer and baseplate wafer for an all-quartz resonator gyroscope. In operation 522, a fourth fused quartz wafer is provided for a cap wafer as shown in FIG. 5A. In operation 524, a cavity is ultrasonically etched into the cap wafer as shown in FIG. 5B. In operation 526, a solder seal ring is deposited with spray coating lithography and lifted-off as shown in FIG. 5C. In operation 528, a vacuum getter is deposited with shadow mask deposition as shown in FIG. 5D. In operation 530, the getter is activated while the cap wafer and the baseplate wafer are still separated and then the cap wafer and the baseplate wafer are contacted to vacuum seal the resonator wafer with the solder seal ring as shown in FIG. 5E. And in operation 532, the cap wafer is then etched to reveal probe pads as shown in FIG. 5F.

Figure 6A:
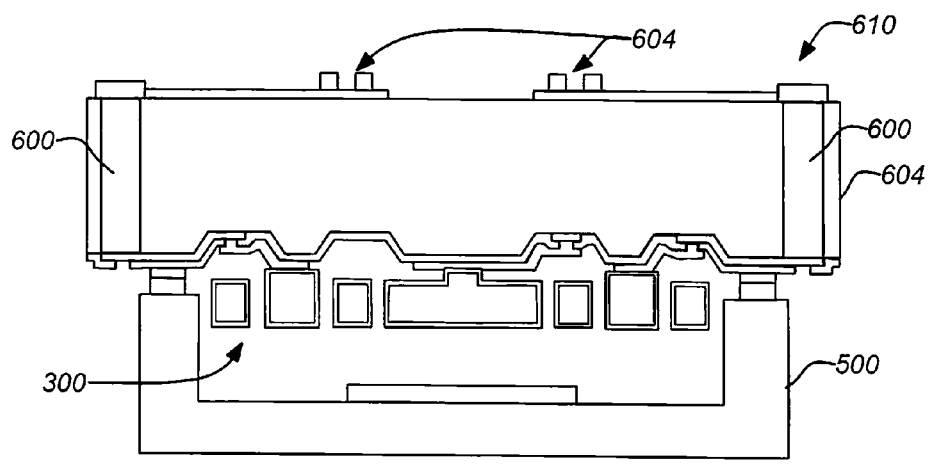
FIGS. 6A and 6B illustrate an embodiment of an all-quartz resonator gyroscope including integral control electronics.
Figure 6B:
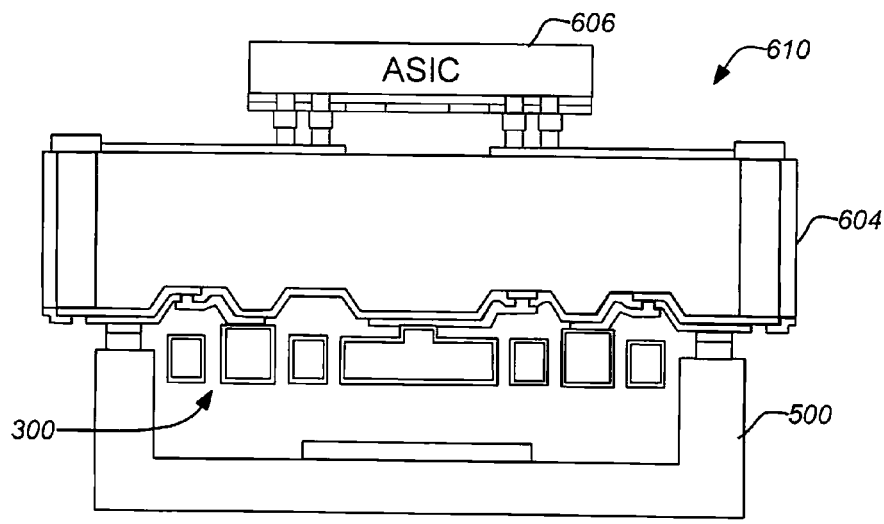

FIGS. 6A and 6B illustrate an embodiment of an all-quartz resonator gyroscope 610 including integral control electronics. In general, the gyroscope 610 is developed as described above with some additional processing. In FIG. 6A the all-quartz disc resonator gyroscope is vacuum sealed (consistent with the process outlined in FIGS. 5A-5G) with through wafer interconnects 600 and backside indium bond pads 602 integrated into the baseplate wafer 604. The baseplate wafer 604 may be produced just as the baseplate wafer 200 of FIGS. 2A-2G with the addition of the through wafer interconnects 600 being integrated into the baseplate wafer 604 prior to the metallization patterning on the wafer to form the interconnects for the electrodes as shown in FIG. 2C. In this case, the metallization is connected to the through wafer interconnects 600. Further metallization may be patterned on the backside of the baseplate wafer 604 from the through wafer interconnects 600 to the bond pads 602. In FIG. 6B control electronics 606 (e.g. an ASIC control electronics chip) may be flip-chip bonded to the all-quartz disc resonator gyroscope package with electrical connections going directly from the electronics to the electrodes and resonator within the vacuum sealed package.

3. Alternate Disc Resonator Gyroscope

In an alternate disc resonator embodiment of the invention, silicon wafers, rather than quartz, may be used to form a vacuum sealed disc resonator gyroscope (DRG). One of the silicon wafers serves as the resonator structure. The remaining silicon wafers are used as a vacuum cap and an electrical baseplate, respectively. The same exemplary planar resonator architecture of FIG. 1A may be used in this embodiment as well. In addition, many of the general processes described above are also applicable to this embodiment with some differences that will be described below. Like the quartz embodiment, the cap wafer in this embodiment also comprises a single wafer having a cavity forming a wall surrounding the disc resonator. However, in this embodiment the resonator is formed directly on the baseplate wafer and not using a handle wafer as with the quartz embodiment. One key difference between embodiments of the invention using quartz and silicon is that portions of the quartz embodiments must be made conductive (e.g. depositing a thin metal layer on the resonator), whereas portions of the silicon embodiments must have proper insulation (e.g. depositing an insulating layer on the baseplate prior to putting down electrical interconnects).

Production of the baseplate is generally performed as illustrated above in FIGS. 2A-2G, except using silicon wafers. The baseplate wafer fabrication begins with a recess etch of the <111> oriented, silicon wafer (e.g. approximately 500 μm thick). Etching as shown in FIG. 2B may be performed using a fluorinechemistry plasma etch process. In addition, a thermal oxide (approximately 2 μm thick) is grown on the recessed baseplate to form an insulating layer 710 and a contact hole in the oxide layer is opened using reactive ion etching to create a way for grounding to the substrate (shown hereafter in FIG. 7C). Note that this insulating layer is not used with the all-quartz embodiment previously described but simply comprises a single additional layer on the surface of the silicon baseplate wafer.

Following this, Ti/Au (approximately 200 Å and 5000 Å, respectively) are metallized on the baseplate to form the interconnects as shown in FIG. 2C. A plasma enhanced chemical vapor deposition (PECVD) silicon dioxide or silicon nitride (5000 Å) is then deposited to form the inter-metal dielectric layer as shown in FIG. 2D. Reactive ion etching (RIE) is then used to open vias through the inter-metal dielectric layer as shown in FIG. 2E. A second metallization of Ti/Au (approximately 200 Å/approximately 5000 Å) is performed to deposit the metal bond pads and aluminum metal (1 μm) is deposited to form the vacuum seal ring as shown in FIG. 2F. This concludes the silicon baseplate wafer fabrication. Different from the all-quartz embodiment, production of the silicon resonator is performed directly on the baseplate without requiring the use of a handle wafer.

Similarly, the process of the flowchart of FIG. 2G applies except that a silicon baseplate wafer is used and the extra step of forming an insulating layer (e.g. oxide layer) with a contact hole to create a ground to the silicon baseplate wafer is performed after etching the baseplate in operation 224 and before depositing the metal interconnects in operation 226.

Figure 7A:
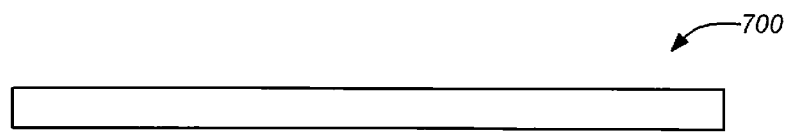
FIGS. 7A-7D illustrate a manufacturing process of a resonator wafer for an alternate silicon resonator gyroscope.
Figure 7B:
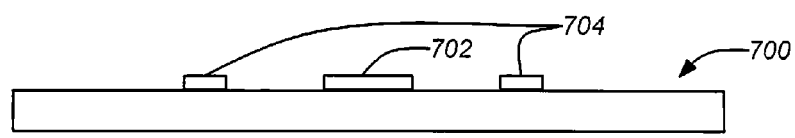
Figure 7C:
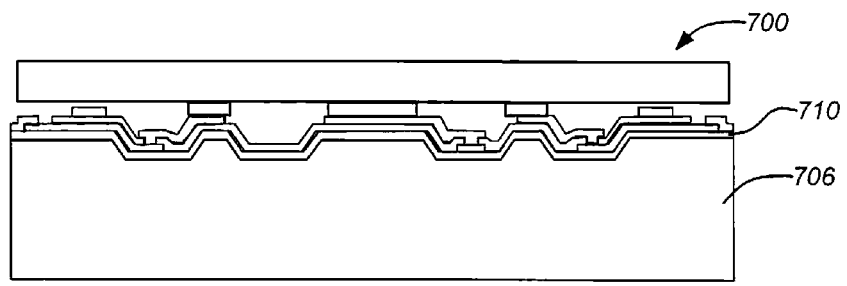
Figure 7D:
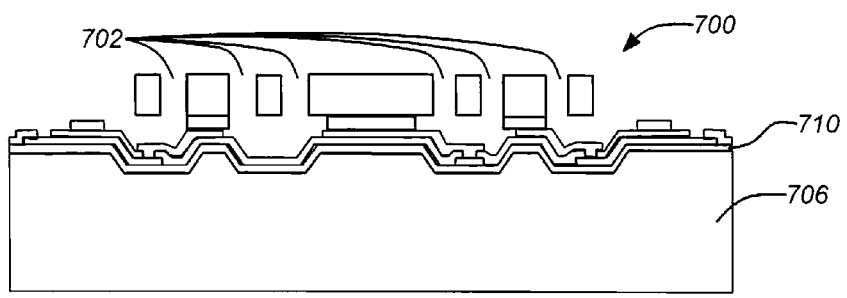

FIGS. 7A-7D illustrate a manufacturing process of the resonator for the alternate silicon resonator gyroscope. The starting material for the resonator wafer process is a <111> oriented, silicon resonator wafer 700 (e.g. approximately 250 μm thick) as shown in FIG. 7A. Ti/Pt/Au (200 Å/500 Å/5000 Å) bond pads may first be deposited on the resonator wafer at the central support location 702 and the electrode locations 704 as shown in FIG. 7B. Then the resonator wafer 700 is flipped and aligned and bonded to the baseplate wafer 706 (developed as described above) using Au—Au thermal compression bonding as shown in FIG. 7C. Finally, the disc resonator structure and its drive and sense electrodes are simultaneously defined by a through-wafer deep reactive ion etching (DRIE) process to form straight walls 708 between the electrodes and the resonator structure mounted at the central support as shown in FIG. 7D. Note that the insulating layer 710 described in the manufacturing process of the baseplate wafer 706 is shown over the etch surface of the baseplate wafer 706 under the electrical interconnects.

Figure 7E:
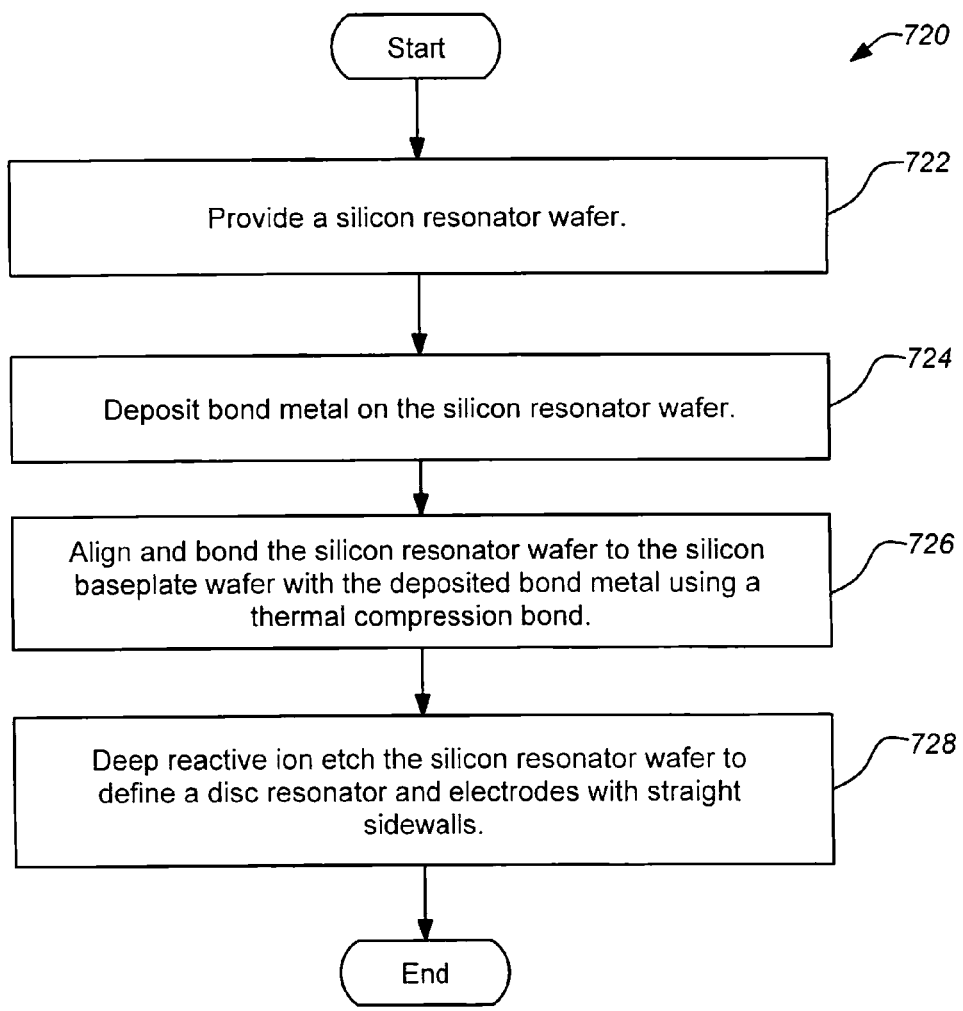
FIG. 7E is a flowchart of an exemplary method of manufacturing the resonator wafer for the alternate silicon resonator gyroscope.

FIG. 7E is a flowchart of an exemplary method 720 of manufacturing the resonator wafer for the alternate silicon resonator gyroscope. In operation 722 a silicon resonator wafer is provided as shown in FIG. 7A. Then in operation 724 bond metal is deposited on the resonator wafer (e.g. at the locations for the central support and electrodes) as shown in FIG. 7B. In operation 726, the silicon resonator wafer is aligned and bonded to the silicon baseplate wafer with the deposited bond metal using a thermal compression bond as shown in FIG. 7C. Finally, in operation 728, a deep reactive ion etch is performed on the silicon resonator wafer to define the disc resonator and electrodes with straight side walls as shown in FIG. 7D.

Hereafter, forming the cap wafer and vacuum sealing is generally performed as illustrated above in FIGS. 5A-5G (except that the wafers are silicon). The process begins with a tin deposition (approximately 5 μm) to form the solder seal ring on the third silicon cap wafer. A cavity etch into the cap wafer is performed using DRIE. A vacuum getter is then deposited into the cavity using a shadow mask. The cap wafer is brought to the resonator baseplate pair and aligned using a bond aligner. The cap is kept in separation from the resonator baseplate pair with 50 μm thick spacers. This three-wafer stack is then transferred to a wafer bonder so that the cavity of the cap wafer can be evacuated through the gap created by the 50 μm thick spacers. Once vacuum is achieved inside the cavity, the vacuum getter is heated to 350° C. for activation. The 50 μm thick spacers are then removed to contact the cap wafer to the resonator baseplate pair to form the vacuum seal with the solder. Finally, the cap wafer is DRIE etched to reveal the probe pads of the gyroscope.

Finally, the all-silicon DRG embodiments of the invention may also be integrated with control electronics like the all-quartz embodiments as illustrated in FIGS. 6A and 6B. However, as noted above, electrical interconnects on the silicon baseplate wafer must be insulated from the conductive wafer material. For example, a thermal oxide layer may be applied between the silicon wafer and any electrical interconnects, e.g. through wafer interconnects or patterned interconnects.

This concludes the description including the preferred embodiments of the present invention. The foregoing description including the preferred embodiment of the invention has been presented for the purposes of illustration and description. It is not intended to be exhaustive or to limit the invention to the precise forms disclosed. Many modifications and variations are possible within the scope of the foregoing teachings. Additional variations of the present invention may be devised without departing from the inventive concept as set forth in the following claims.

What is claimed is:

1. A sensor, comprising:
   a disc resonator having a central support and an ultra thin conductive layer deposited on etched side walls of the disc resonator;
   a baseplate wafer for supporting the disc resonator at the central support; and
   a cap wafer covering the disc resonator;
   wherein the baseplate wafer and the cap wafer comprise an enclosure of the disc resonator and the cap wafer comprises a single wafer having a cavity forming a wall surrounding the disc resonator and the wall is bonded directly to the baseplate wafer to enclose the disc resonator.

2. The sensor of claim 1, where the baseplate wafer and the cap wafer enclose the disc resonator under a vacuum seal.

3. The sensor of claim 1, where the disc resonator includes a plurality of circumferential slots and electrodes for driving the disc resonator and sensing motion of the disc resonator occupy at least some of the plurality of circumferential slots where the electrodes are supported by the baseplate wafer.

4. The sensor of claim 1, where electrodes for driving the disc resonator and sensing motion of the disc resonator are electrically coupled to electrical interconnects patterned on the baseplate wafer and passing under the wall of the cap wafer.

5. The sensor of claim 4, where the electrical interconnects are electrically coupled to control electronics on an exterior surface of the baseplate wafer.

6. The sensor of claim 1, further comprising an on-chip getter within the enclosure.

7. The sensor of claim 6, wherein the on-chip getter is activated with the baseplate and the cap wafer in near separation before sealing the enclosure.

8. The sensor of claim 1, wherein both the disc resonator and electrodes for driving the disc resonator and sensing motion of the disc resonator are formed by through etching a resonator wafer.

9. The sensor of claim 8, wherein through etching the resonator wafer comprises deep reactive ion etching (DRIE).

10. The sensor of claim 8, wherein the disc resonator, the baseplate wafer and the cap wafer each comprise silicon and the disc resonator and the electrodes are formed by through etching a silicon resonator wafer bonded to the baseplate wafer.

11. The sensor of claim 8, wherein the disc resonator, the baseplate wafer and the cap wafer each comprise quartz and the disc resonator and the electrodes are formed by through etching a quartz resonator wafer bonded to a handle wafer.

12. The sensor of claim 11, wherein the handle wafer is removed after aligning and bonding the formed disc resonator to the baseplate wafer.

13. A method of producing a sensor, comprising the steps of:
producing a disc resonator having a central support;
depositing an ultra thin conductive layer on etched side walls of the disc resonator;
producing a baseplate wafer for supporting the disc resonator at the central support;
producing a cap wafer covering the disc resonator, the cap wafer comprising a single wafer having a cavity forming a wall surrounding the disc resonator; and
bonding the wall directly to the baseplate wafer to enclose the disc resonator where the baseplate wafer and the cap wafer comprise an enclosure of the disc resonator.

14. The method of claim 13, further comprising enclosing the disc resonator under a vacuum seal with the baseplate wafer and the cap wafer.

15. The method of claim 13, where the disc resonator includes a plurality of circumferential slots and electrodes for driving the disc resonator and sensing motion of the disc resonator occupy at least some of the plurality of circumferential slots where the electrodes are supported by the baseplate wafer.

16. The method of claim 13, further comprising electrically coupling electrodes for driving the disc resonator and sensing motion of the disc resonator to electrical interconnects patterned on the baseplate wafer and passing under the wall of the cap wafer.

17. The method of claim 16, further comprising electrically coupling the electrical interconnects to control electronics on an exterior surface of the baseplate wafer.

18. The method of claim 13, further comprising enclosing an on-chip getter within the enclosure.

19. The method of claim 18, further comprising activating the on-chip getter with the baseplate and the cap wafer in near separation before sealing the enclosure.

20. The method of claim 13, further comprising forming both the disc resonator and electrodes for driving the disc resonator and sensing motion of the disc resonator by through etching a resonator wafer.

21. The method of claim 20, wherein through etching the resonator wafer comprises deep reactive ion etching (DRIE).

22. The method of claim 20, wherein the disc resonator, the baseplate wafer and the cap wafer each comprise silicon and the disc resonator and the electrodes are formed by through etching a silicon resonator wafer bonded to the baseplate wafer.

23. The method of claim 20, wherein the disc resonator, the baseplate wafer and the cap wafer each comprise quartz and the disc resonator and the electrodes are formed by through etching a quartz resonator wafer bonded to a handle wafer.

24. The method of claim 23, further comprising removing the handle wafer after aligning and bonding the formed disc resonator to the baseplate wafer.

25. A sensor, comprising:
a disc resonator means for sensing motion having a central support and an ultra thin conductive layer deposited on etched side walls of the disc resonator means;
a baseplate wafer means for supporting the disc resonator at the central support; and
a cap wafer means for covering the disc resonator;
wherein the baseplate wafer means and the cap wafer means comprise an enclosure of the disc resonator means and the cap wafer means comprises a single wafer having a cavity forming a wall surrounding the disc resonator means and the wall is bonded directly to the baseplate wafer means to enclose the disc resonator means.

* * * * *